United States Patent
Kim et al.

(10) Patent No.: US 11,888,774 B2
(45) Date of Patent: Jan. 30, 2024

(54) METHOD AND APPARATUS FOR CHANNEL ESTIMATION IN COMMUNICATION SYSTEM

(71) Applicant: ELECTRONICS AND TELECOMMUNICATIONS RESEARCH INSTITUTE, Daejeon (KR)

(72) Inventors: Kyeong Pyo Kim, Daejeon (KR); Woo Ram Shin, Daejeon (KR); Young Jo Ko, Daejeon (KR); Kap Seok Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 184 days.

(21) Appl. No.: 17/500,402

(22) Filed: Oct. 13, 2021

(65) Prior Publication Data
US 2022/0329376 A1    Oct. 13, 2022

(30) Foreign Application Priority Data

Mar. 31, 2021   (KR) .......................... 10-2021-0041718

(51) Int. Cl.
   H04L 5/00        (2006.01)
   H04W 72/0446     (2023.01)
   H04L 25/02       (2006.01)

(52) U.S. Cl.
   CPC ........ H04L 5/0048 (2013.01); H04L 25/0224 (2013.01); H04W 72/0446 (2013.01)

(58) Field of Classification Search
   CPC .......................... H04L 5/0048; H04L 25/0224
   See application file for complete search history.

(56) References Cited

U.S. PATENT DOCUMENTS

| | | | |
|---|---|---|---|
| 5,995,533 A | 11/1999 | Hassan et al. | |
| 10,666,479 B2 | 5/2020 | Hadani et al. | |
| 2016/0330678 A1 | 11/2016 | Yoon et al. | |
| 2017/0201362 A1 | 7/2017 | Park et al. | |
| 2017/0288743 A1 | 10/2017 | Nam et al. | |
| 2018/0109402 A1 | 4/2018 | Noh et al. | |
| 2018/0262306 A1* | 9/2018 | Hadani | H04L 5/0023 |
| 2018/0302245 A1 | 10/2018 | Oh et al. | |
| 2019/0238189 A1* | 8/2019 | Delfeld | H04L 27/2628 |

(Continued)

FOREIGN PATENT DOCUMENTS

KR      1020170046489 A      5/2017

OTHER PUBLICATIONS

Alexander Fish et al., "Delay-Doppler Channel Estimation in Almost Linear Complexity," IEEE Transactions on Information Theory, vol. 59, No. 11, pp. 7632-7644, Jul. 18, 2013.

(Continued)

*Primary Examiner* — Zhiren Qin
(74) *Attorney, Agent, or Firm* — Rabin & Berdo, P.C.

(57) ABSTRACT

An operation method of a transmitter in a communication system may comprise: configuring a first reference signal region for transmission of a first reference signal in the delay-Doppler domain; arranging the first reference signal having a sequence form in a specific region within the first reference signal region; transforming a delay-Doppler domain signal including the first reference signal into a time domain signal; and transmitting the time domain signal to a receiver.

9 Claims, 28 Drawing Sheets

(56) References Cited

U.S. PATENT DOCUMENTS

2019/0356441 A1 11/2019 Jiang et al.
2020/0137774 A1* 4/2020 Molisch ............... H04L 5/0048
2020/0153590 A1 5/2020 Ko et al.
2020/0259604 A1 8/2020 Hadani et al.
2021/0288850 A1* 9/2021 Halbauer ............. H04L 5/0007

OTHER PUBLICATIONS

P. Raviteja et al., "Embedded Pilot-Aided Channel Estimation for OTFS in Delay-Doppler Channels," IEEE Transactions on Vehicular Technology, vol. 68, No. 5, pp. 4906-4917, Mar. 20, 2019.

* cited by examiner

FIG. 26

| $h_{33}$ | $h_{32}$ | $h_{31}$ | $h_{34}$ | $h_{23}$ | $h_{22}$ | $h_{21}$ | $h_{24}$ | $h_{13}$ | $h_{12}$ | $h_{11}$ | $h_{14}$ | $h_{43}$ | $h_{42}$ | $h_{41}$ | $h_{44}$ |
| --- | --- | --- | --- | --- | --- | --- | --- | --- | --- | --- | --- | --- | --- | --- | --- |
| $h_{34}$ | $h_{33}$ | $h_{32}$ | $h_{31}$ | $h_{24}$ | $h_{23}$ | $h_{22}$ | $h_{21}$ | $h_{14}$ | $h_{13}$ | $h_{12}$ | $h_{11}$ | $h_{44}$ | $h_{43}$ | $h_{42}$ | $h_{41}$ |
| $h_{31}$ | $h_{34}$ | $h_{33}$ | $h_{32}$ | $h_{21}$ | $h_{24}$ | $h_{23}$ | $h_{22}$ | $h_{11}$ | $h_{14}$ | $h_{13}$ | $h_{12}$ | $h_{41}$ | $h_{44}$ | $h_{43}$ | $h_{42}$ |
| $h_{32}$ | $h_{31}$ | $h_{34}$ | $h_{33}$ | $h_{22}$ | $h_{21}$ | $h_{24}$ | $h_{23}$ | $h_{12}$ | $h_{11}$ | $h_{14}$ | $h_{13}$ | $h_{42}$ | $h_{41}$ | $h_{44}$ | $h_{43}$ |
| $h_{43}$ | $h_{42}$ | $h_{41}$ | $h_{44}$ | $h_{33}$ | $h_{32}$ | $h_{31}$ | $h_{34}$ | $h_{23}$ | $h_{22}$ | $h_{21}$ | $h_{24}$ | $h_{13}$ | $h_{12}$ | $h_{11}$ | $h_{14}$ |
| $h_{44}$ | $h_{43}$ | $h_{42}$ | $h_{41}$ | $h_{34}$ | $h_{33}$ | $h_{32}$ | $h_{31}$ | $h_{24}$ | $h_{23}$ | $h_{22}$ | $h_{21}$ | $h_{14}$ | $h_{13}$ | $h_{12}$ | $h_{11}$ |
| $h_{41}$ | $h_{44}$ | $h_{43}$ | $h_{42}$ | $h_{31}$ | $h_{34}$ | $h_{33}$ | $h_{32}$ | $h_{21}$ | $h_{24}$ | $h_{23}$ | $h_{22}$ | $h_{11}$ | $h_{14}$ | $h_{13}$ | $h_{12}$ |
| $h_{42}$ | $h_{41}$ | $h_{44}$ | $h_{43}$ | $h_{32}$ | $h_{31}$ | $h_{34}$ | $h_{33}$ | $h_{22}$ | $h_{21}$ | $h_{24}$ | $h_{23}$ | $h_{12}$ | $h_{11}$ | $h_{14}$ | $h_{13}$ |
| $h_{13}$ | $h_{12}$ | $h_{11}$ | $h_{14}$ | $h_{43}$ | $h_{42}$ | $h_{41}$ | $h_{44}$ | $h_{33}$ | $h_{32}$ | $h_{31}$ | $h_{34}$ | $h_{23}$ | $h_{22}$ | $h_{21}$ | $h_{24}$ |
| $h_{14}$ | $h_{13}$ | $h_{12}$ | $h_{11}$ | $h_{44}$ | $h_{43}$ | $h_{42}$ | $h_{41}$ | $h_{34}$ | $h_{33}$ | $h_{32}$ | $h_{31}$ | $h_{24}$ | $h_{23}$ | $h_{22}$ | $h_{21}$ |
| $h_{11}$ | $h_{14}$ | $h_{13}$ | $h_{12}$ | $h_{41}$ | $h_{44}$ | $h_{43}$ | $h_{42}$ | $h_{31}$ | $h_{34}$ | $h_{33}$ | $h_{32}$ | $h_{21}$ | $h_{24}$ | $h_{23}$ | $h_{22}$ |
| $h_{12}$ | $h_{11}$ | $h_{14}$ | $h_{13}$ | $h_{42}$ | $h_{41}$ | $h_{44}$ | $h_{43}$ | $h_{32}$ | $h_{31}$ | $h_{34}$ | $h_{33}$ | $h_{22}$ | $h_{21}$ | $h_{24}$ | $h_{23}$ |
| $h_{23}$ | $h_{22}$ | $h_{21}$ | $h_{24}$ | $h_{13}$ | $h_{12}$ | $h_{11}$ | $h_{14}$ | $h_{43}$ | $h_{42}$ | $h_{41}$ | $h_{44}$ | $h_{33}$ | $h_{32}$ | $h_{31}$ | $h_{34}$ |
| $h_{24}$ | $h_{23}$ | $h_{22}$ | $h_{21}$ | $h_{14}$ | $h_{13}$ | $h_{12}$ | $h_{11}$ | $h_{44}$ | $h_{43}$ | $h_{42}$ | $h_{41}$ | $h_{34}$ | $h_{33}$ | $h_{32}$ | $h_{31}$ |
| $h_{21}$ | $h_{24}$ | $h_{23}$ | $h_{22}$ | $h_{11}$ | $h_{14}$ | $h_{13}$ | $h_{12}$ | $h_{41}$ | $h_{44}$ | $h_{43}$ | $h_{42}$ | $h_{31}$ | $h_{34}$ | $h_{33}$ | $h_{32}$ |
| $h_{22}$ | $h_{21}$ | $h_{24}$ | $h_{23}$ | $h_{12}$ | $h_{11}$ | $h_{14}$ | $h_{13}$ | $h_{42}$ | $h_{41}$ | $h_{44}$ | $h_{43}$ | $h_{32}$ | $h_{31}$ | $h_{34}$ | $h_{33}$ |

FIG. 27

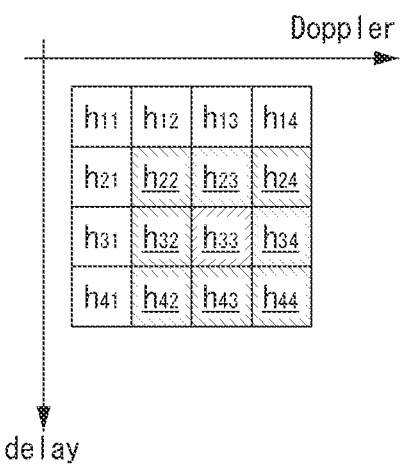

METHOD AND APPARATUS FOR CHANNEL ESTIMATION IN COMMUNICATION SYSTEM

CROSS-REFERENCE TO RELATED APPLICATIONS

This application claims priority to Korean Patent Application No. 10-2021-0041718, filed on Mar. 31, 2021, with the Korean Intellectual Property Office (KIPO), the entire contents of which are hereby incorporated by reference.

BACKGROUND

1. Technical Field

The present disclosure relates to a technique of channel estimation in a communication system, and more particularly, to a technique of channel estimation in the delay-Doppler domain.

2. Related Art

With the development of information and communication technologies, various wireless communication technologies are being developed. Representative wireless communication technologies include long term evolution (LTE), new radio (NR), or the like defined as the 3rd generation partnership project (3GPP) specifications. The LTE may be one of 4th generation (4G) wireless communication technologies, and the NR may be one of 5th generation (5G) wireless communication technologies.

The communication system (e.g., a new radio (NR) communication system) using a higher frequency band (e.g., a frequency band of 6 GHz or above) than a frequency band (e.g., a frequency band of 6 GHz or below) of the long term evolution (LTE) communication system (or, LTE-A communication system) is being considered for processing of soaring wireless data. The 5G communication system may support enhanced Mobile BroadBand (eMBB), Ultra Reliable Low Latency Communication (URLLC), and Massive Machine Type Communication (mMTC).

Meanwhile, a reference signal may be used for channel estimation in a communication system (e.g., 4G communication system or 5G communication system). Methods for estimating a channel in a communication environment with severe distortion due to a Doppler spread, delay spread, and the like are needed.

SUMMARY

Accordingly, exemplary embodiments of the present disclosure are directed to providing a method and an apparatus for channel estimation in a communication system.

According to a first exemplary embodiment of the present disclosure, an operation method of a transmitter in a communication system may comprise: configuring a first reference signal region for transmission of a first reference signal in a delay-Doppler domain; arranging the first reference signal having a sequence form in a specific region within the first reference signal region; transforming a delay-Doppler domain signal including the first reference signal into a time domain signal; and transmitting the time domain signal to a receiver.

The first reference signal may be a sequence having auto-correlation characteristics greater than or equal to a preset reference.

The first reference signal may be arranged along a delay axis within the first reference signal region.

The specific region in which the first reference signal is arranged may be a central region within the first reference signal region.

The operation method may further comprise: configuring a second reference signal region for transmission of a second reference signal in the delay-Doppler domain; and arranging the second reference signal having a sequence form in a specific region within the second reference signal region, wherein the delay-Doppler domain signal further includes the second reference signal as well as the first reference signal.

A sum of a result of an auto-correlation operation of the first reference signal and a result of an auto-correlation operation of the second reference signal may have perfect auto-correlation characteristics.

The first reference signal region and the second reference signal region may be independently configured so that interference between the first reference signal and the second reference signal does not occur in the receiver.

The first reference signal may have a 1-dimensional form or a 2-dimensional form.

The first reference signal may have a random value which is known at both the transmitter and the receiver.

The specific region may be a region in which interference from outside of the first reference signal region does not exist.

According to a second exemplary embodiment of the present disclosure, an operation method of a receiver in a communication system may comprise: receiving a time domain signal from a transmitter; transforming the time domain signal into a delay-Doppler domain signal; separating a reference signal region configured for transmission and reception of a reference signal in a delay-Doppler domain; performing a cross-correlation operation on the reference signal region; determining an effective region within the reference signal region based on a result of the cross-correlation operation; and estimating a channel based on a result of the cross-correlation operation on the effective region.

The performing of the cross-correlation operation may comprise: performing a one-dimensional cross-correlation operation along a delay axis at a first point on a Doppler axis within the reference signal region; and performing a one-dimensional cross-correlation operation along the delay axis at a second point on the Doppler axis within the reference signal region.

The reference signal may be a sequence having auto-correlation characteristics greater than or equal to a preset reference.

The specific region in which the reference signal is arranged may be a central region within the reference signal region.

According to a third exemplary embodiment of the present disclosure, an operation method of a receiver in a communication system may comprise: receiving a time domain signal from a transmitter; transforming the time domain signal into a delay-Doppler domain signal; separating a first reference signal region configured for transmission and reception of a first reference signal ad a second reference signal region configured for transmission and reception of a second reference signal in a delay-Doppler domain; determining a first effective region by performing a first cross-correlation operation on the first reference signal region; determining a second effective region by performing a second cross-correlation operation on the second reference signal region; and estimating a channel based on a combination of a result of the first cross-correlation operation on the first effective region and a result of the second cross-correlation operation on the second effective region.

The determining of the first effective region may comprise: performing a one-dimensional cross-correlation operation along a delay axis at a first point on a Doppler axis within the first reference signal region; performing a one-dimensional cross-correlation operation along the delay axis at a second point on the Doppler axis within the first reference signal region; and determining the first effective region based on results of the one-dimensional cross-correlation operations.

A sum of a result of an auto-correlation operation of the first reference signal and a result of an auto-correlation operation of the second reference signal may have perfect auto-correlation characteristics.

The first reference signal region and the second reference signal region may be independently configured so that interference between the first reference signal and the second reference signal does not occur.

The time domain signal may include the first reference signal, the second reference signal, and data.

According to the present disclosure, when estimating a channel in the delay-Doppler domain, a one-dimensional sequence (e.g., one-dimensional spread sequence) along a delay axis, instead of a two-dimensional impulse signal, may be used as a reference signal. In this case, a peak-to-average power ratio (PAPR) problem of a time domain signal may be alleviated, and the channel estimation performance may be maintained. Accordingly, the performance of the communication system can be improved.

BRIEF DESCRIPTION OF DRAWINGS

FIG. 26 is a conceptual diagram illustrating a first exemplary embodiment of a delay-Doppler effective channel matrix when N=M=4.

FIG. 27 is a conceptual diagram illustrating a first exemplary embodiment of a delay-Doppler channel matrix when N=M=4.

DETAILED DESCRIPTION OF THE EMBODIMENTS

Figure 1:
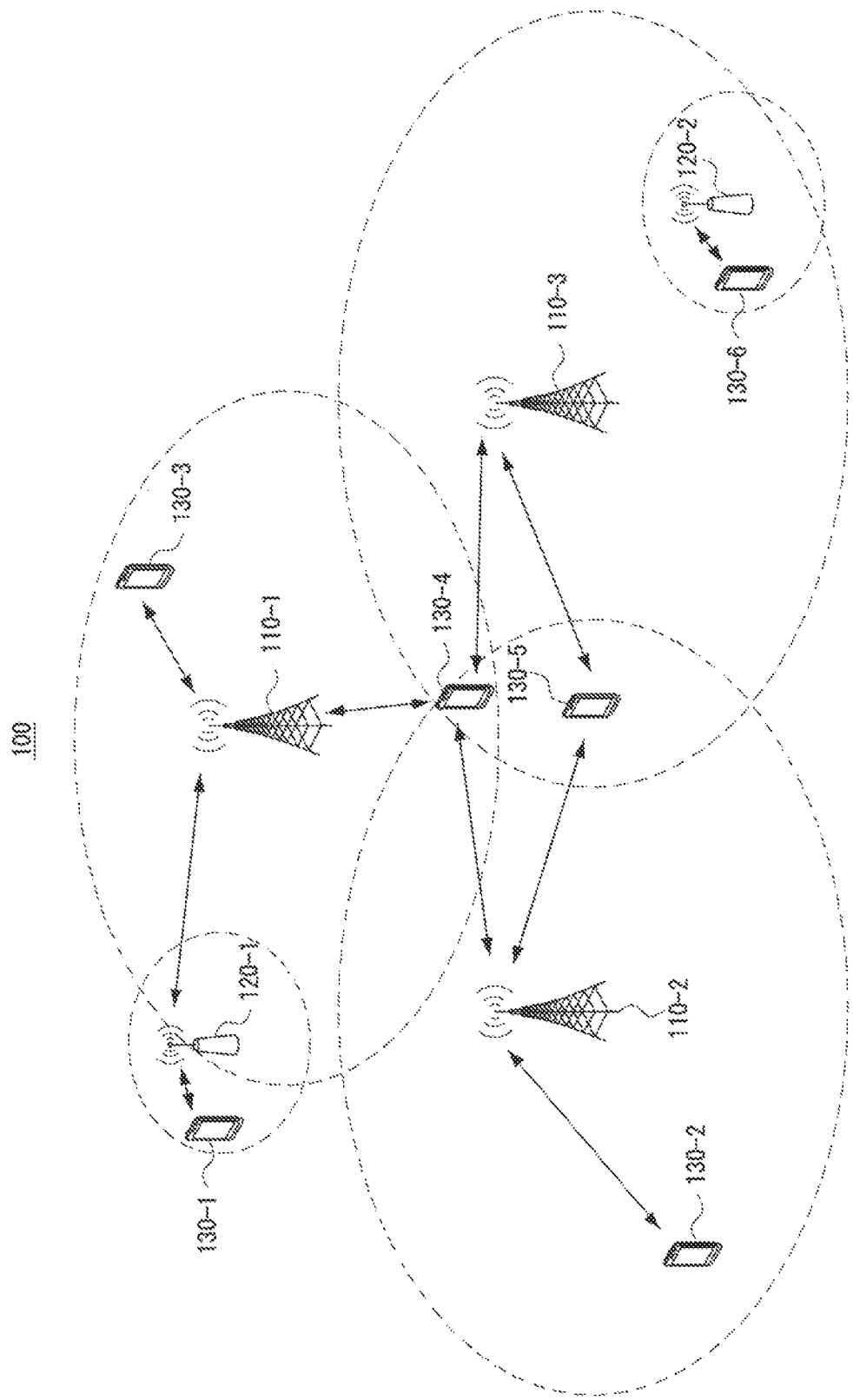
FIG. 1 is a conceptual diagram illustrating a first exemplary embodiment of a communication system.

While the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. In addition, the communication system 100 may further comprise a core network (e.g., a serving gateway (S-GW), a packet data network (PDN) gateway (P-GW), and a mobility management entity (MME)). When the communication system 100 is a 5G communication system (e.g., New Radio (NR) system), the core network may include an access and mobility management function (AMF), a user plane function (UPF), a session management function (SMF), and the like.

The plurality of communication nodes 110 to 130 may support communication protocols defined in the 3rd generation partnership project (3GPP) technical specifications (e.g., LTE communication protocol, LTE-A communication protocol, NR communication protocol, or the like). The plurality of communication nodes 110 to 130 may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
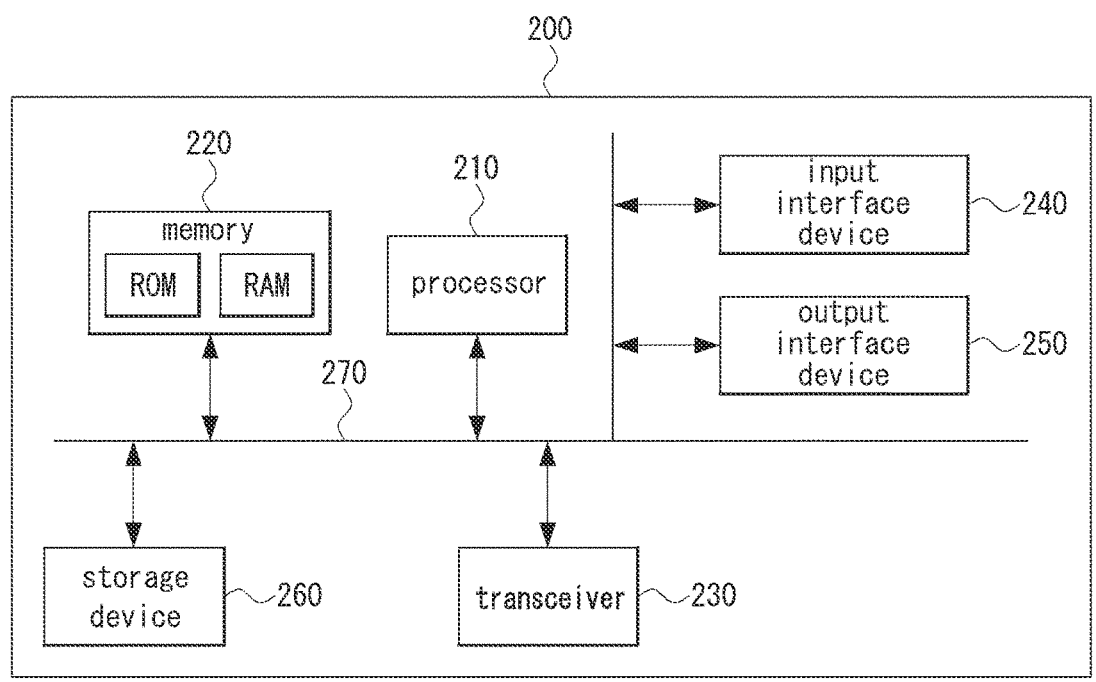
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like.

Each component included in the communication node 200 may communicate with each other as connected through a bus 270.

However, each of the components included in the communication node 200 may not be connected to the processor 210 not through the common bus 270 but through an individual interface or an individual bus. For example, the processor 210 may be connected to at least one of the memory 220, the transceiver 230, the input interface device 240, the output interface device 250, and the storage device 260 through a dedicated interface(s).

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), or the like.

Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for channel estimation in the communication system will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

Figure 3:
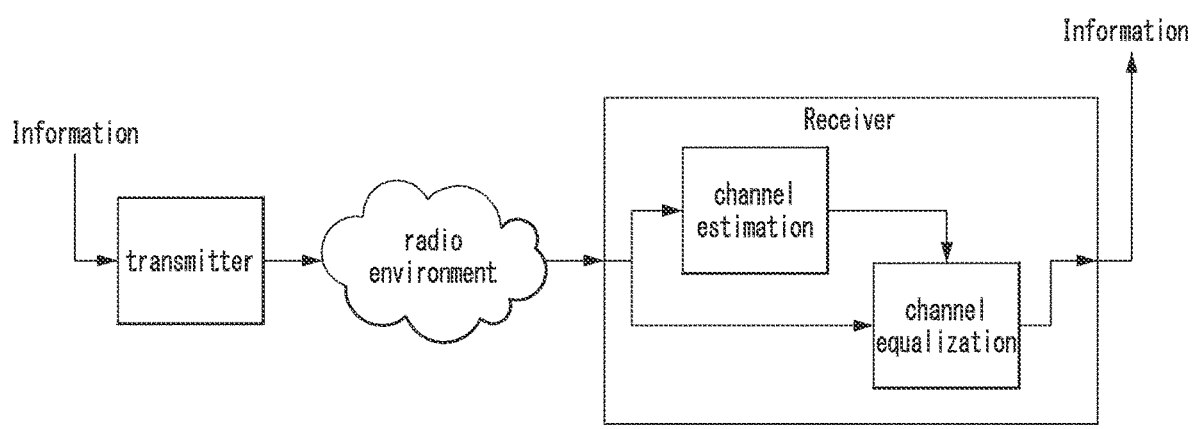
FIG. 3 is a conceptual diagram illustrating a second exemplary embodiment of a communication system.

FIG. 3 is a conceptual diagram illustrating a second exemplary embodiment of a communication system.

Referring to FIG. 3, a communication system may include a transmitter and a receiver. Each of the transmitter and the receiver may be a base station or a terminal. Each of the transmitter and the receiver may be configured identically or similarly to the communication node 200 shown in FIG. 2. The transmitter may transmit a signal modulated based on a specific scheme wirelessly (e.g., over a radio channel). The receiver may receive the signal from the transmitter, and may extract a desired signal by demodulating the received signal. The performance of the communication system may vary depending on how it overcomes a radio channel environment that is an intermediate medium between the transmitter and the receiver. When the radio channel environment between the transmitter and the receiver is a high-speed moving environment, transmission signals may be distorted due to Doppler spread. When the radio channel environment between the transmitter and the receiver is an environment with many obstacles, transmission signals may be distorted due to delay spread.

In order to overcome such the radio channel environments, the receiver may estimate the radio channel environment, and perform an equalization operation on the radio channel environment based on the estimation result to remove influences of the radio channel environment on the received signal distorted by the radio channel environment. The receiver may extract an original signal transmitted by the transmitter by performing the above-described operations. In this case, the estimation of the radio channel environment, performed by the receiver, may be referred to as 'channel estimation'. The accuracy of the channel estimation may be one of important factors influencing the performance of the communication system. When the channel estimation is inaccurate, the channel equalization operation may be performed using inaccurate channel estimation information. In this case, the distortion caused by the radio channel environment cannot be accurately removed from the received signal, and accordingly, the receiver may not be able to detect the original signal transmitted by the transmitter from the received signal.

The channel estimation operation may be performed according to various methods. For example, the channel estimation operation may be performed using a signal preconfigured between the transmitter and the receiver. In this case, the preconfigured signal may be referred to as a 'reference signal'. Each of the transmitter and the receiver may estimate the radio channel environment by transmitting and receiving a reference signal through the radio channel environment. The transmitter may modulate the reference signal, and transmit the modulated reference signal over the radio channel environment. The receiver may compare the original reference signal with a received signal (e.g., reference signal) by demodulating the received signal distorted by the radio channel environment. In this case, the receiver may perform channel estimation in such a manner that only distortion components of the radio channel environment are extracted by appropriately processing a difference between the original reference signal and the distorted received signal.

The reference signal for channel estimation may vary according to a modulation scheme of the communication system. In a wireless local area network (LAN) system and a cellular communication system, a signal may be modulated based on an OFDM scheme. When the OFDM scheme is used, a time domain signal may be divided into a constant unit size, and each time domain signal having the constant unit size may be spread by using a Fourier sequence. That is, the OFDM scheme may be a scheme using a feature in which a time domain signal is transformed into a frequency domain signal by using a Fourier sequence. In the OFDM modulation process, a communication node (e.g., transmitter) may first allocate or generate a desired signal in the frequency domain, divide the signal into frequency domain signals each having a certain unit size, transform each frequency domain signal having the certain unit size into a time domain signal by spreading it using an inverse Fourier sequence, and transmit the transformed time domain signal through a radio channel environment. When the OFDM modulation scheme is used, since the signal is allocated in the frequency domain, it may be convenient to perform signal processing in the frequency domain rather than the time domain in which signals are actually transmitted over the air. Accordingly, in the OFDM-based communication system, the operation for designing and allocating the reference signal for channel estimation may be performed in the frequency domain, and the channel estimation operation may also be generally performed in the frequency domain.

Figure 4:
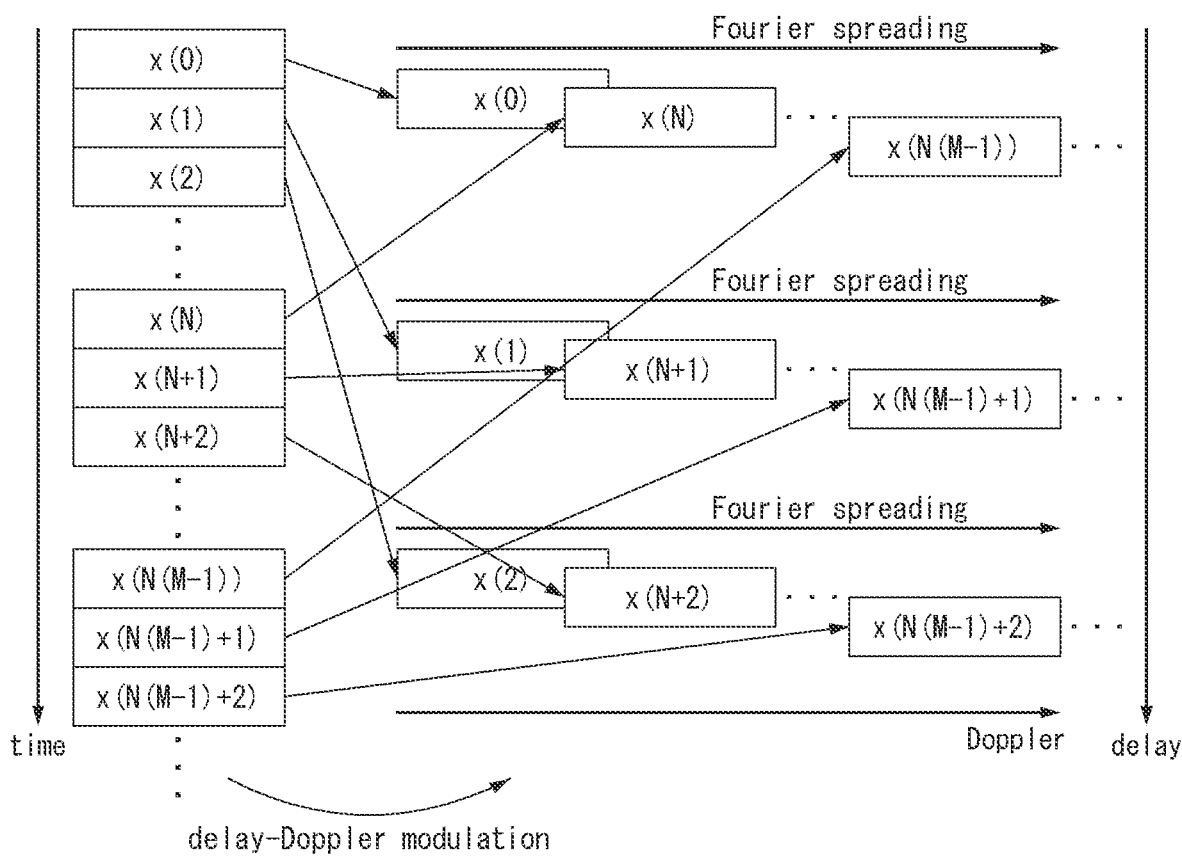
FIG. 4 is a conceptual diagram illustrating a first exemplary embodiment of a delay-Doppler modulation scheme in a communication system.

FIG. 4 is a conceptual diagram illustrating a first exemplary embodiment of a delay-Doppler modulation scheme in a communication system.

Referring to FIG. 4, a delay-Doppler modulation scheme may be used as well as the OFDM modulation scheme. The delay-Doppler modulation scheme may be a modulation scheme used by a radar for determining a speed, position, etc. of a moving object in a radio channel environment. When the delay-Doppler modulation scheme is used, unlike the OFDM modulation scheme, a communication node (e.g., transmitter) may extract a time domain signal by a constant unit size at regular intervals, and rearrange the respective signals each having the constant unit size by spreading the signals with a Fourier sequence. In this case, the signal may be transformed into a frequency domain signal in the same manner as in the OFDM modulation scheme, but since the signals before spreading are signals having a constant interval rather than continuous time domain signals as in the OFDM modulation scheme, the signal domain after spreading may be referred to as 'Doppler domain' rather than the frequency domain. In addition, a two-dimensional signal may be constructed by performing the above-described Fourier spreading process in parallel with respect to one time domain signal. In this case, one dimension may be defined as the above-described Doppler domain, and the other dimension may be defined as a delay domain. The above-described modulation scheme may be referred to as a 'delay-Doppler modulation scheme'. In the delay-Doppler modulation scheme, since the process of allocating a transmission signal and the process of demodulating a reception signal are performed in the two-dimensional delay-Doppler domain, it may be advantageous that a reference signal for channel estimation is also designed/allocated in the two-dimensional delay-Doppler domain.

In the delay-Doppler domain, a relationship among the transmission signal, the reception signal, and the channel may be a two-dimensional convolutional relationship. That is, a reception signal matrix in the two-dimensional delay-Doppler domain may be expressed as a two-dimensional convolution between a transmission signal matrix and the channel in the two-dimensional delay-Doppler domain. This may be defined as Equation 1 below.

$$y_{Dd}(\tau, v) = \sum_p \sum_q \hat{h}_{Dd}(p, q) x_{Dd}(\tau - p, v - q) \quad \text{[Equation 1]}$$

Here, $y_{Dd}(\tau,v)$ may mean a matrix element located on the v-th Doppler axis and the th τ-th delay axis in the reception signal transformed into a delay-Doppler domain signal. $x_{Dd}(\tau, v)$ may mean a matrix element located on the v-th Doppler axis and the th τ-th delay axis in the transmission signal. $\hat{h}_{Dd}(\tau, v)$ may mean a matrix element located on the v-th Doppler axis and the th τ-th delay axis in the channel. That is, in the delay-Doppler domain, the reception signal may be expressed as a two-dimensional convolution of the transmission signal and the channel. More precisely, when the radio channel environment does not change with time, the reception signal can be accurately expressed as the two-dimensional convolution between the transmission signal and the channel, but when the radio channel environment changes with time, the reception signal may be expressed as a sum of the two-dimensional convolution between the transmission signal and the channel and interference components.

In a rapidly changing radio channel environment, the channel estimation performance according to the delay-Doppler modulation scheme may be better than the channel estimation performance according to the OFDM modulation scheme. In exemplary embodiments below, methods for designing a reference signal suitable for the communication system and having excellent channel estimation performance when the delay-Doppler modulation scheme is used will be proposed.

Figure 5:
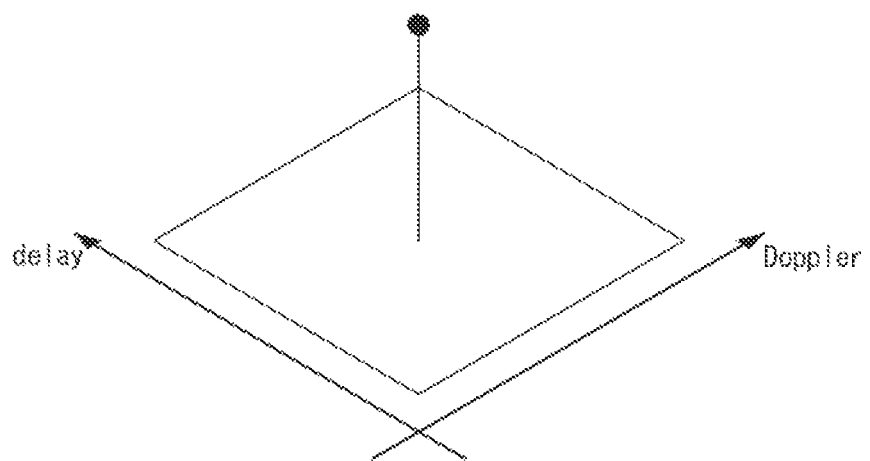
FIG. 5 is a conceptual diagram illustrating a first exemplary embodiment of a two-dimensional impulse signal in the delay-Doppler domain.

FIG. 5 is a conceptual diagram illustrating a first exemplary embodiment of a two-dimensional impulse signal in the delay-Doppler domain.

Referring to FIG. 5, the delay-Doppler modulation scheme may be used in a radio environment (e.g., radio channel environment) where distortion is severe due to Doppler spread, delay spread, and the like. When the transmitter transmits a signal to the receiver in the radio environment where distortion is severe due to Doppler spread, delay spread, and the like, distortion components caused by the radio environment may be removed by channel estimation. In this case, accurate channel estimation may be performed by using a reference signal for channel estimation. In the communication system using the delay-Doppler modulation scheme, the reference signal for channel estimation may be a two-dimensional impulse signal in the delay-Doppler domain.

Figure 6:
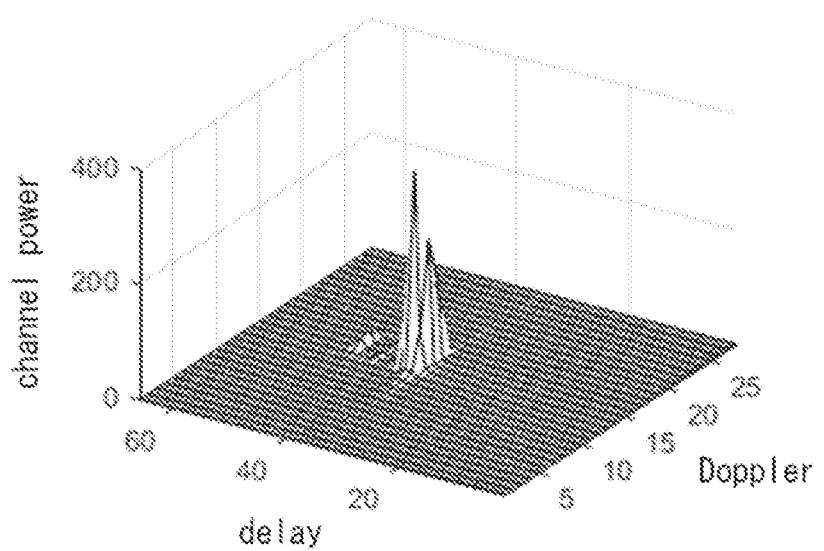
FIG. 6 is a conceptual diagram illustrating a first exemplary embodiment of a channel impulse response in the delay-Doppler domain.

FIG. 6 is a conceptual diagram illustrating a first exemplary embodiment of a channel impulse response in the delay-Doppler domain.

Referring to FIG. 6, the reception signal in the delay-Doppler domain may be expressed by a two-dimensional convolution operation between the transmission signal and the channel. In such the system model, a two-dimensional impulse signal may be transmitted instead of the transmission signal, whereby a channel impulse response therefor may be obtained at the receiver. The channel impulse response in the radio environment may be identified in some resources in the delay-Doppler domain. The size of a period (e.g., region) in which the channel impulse response has a value greater than or equal to a certain level may be proportional to the degree of Doppler spread and/or delay spread in the radio environment. That is, when the radio environment is a high-speed moving environment or an environment with many obstacles, the period in which the channel impulse response is identified may increase.

Based on the above-described characteristics, some periods in the entire 2D delay-Doppler domain may be allocated for the channel impulse response, and other periods with little channel impulse response may be allocated as data periods. In this case, a structure of a transmission signal capable of simultaneously performing channel estimation and data transmission may be designed. In exemplary embodiments, the 'period' may mean 'region'.

Figure 7:
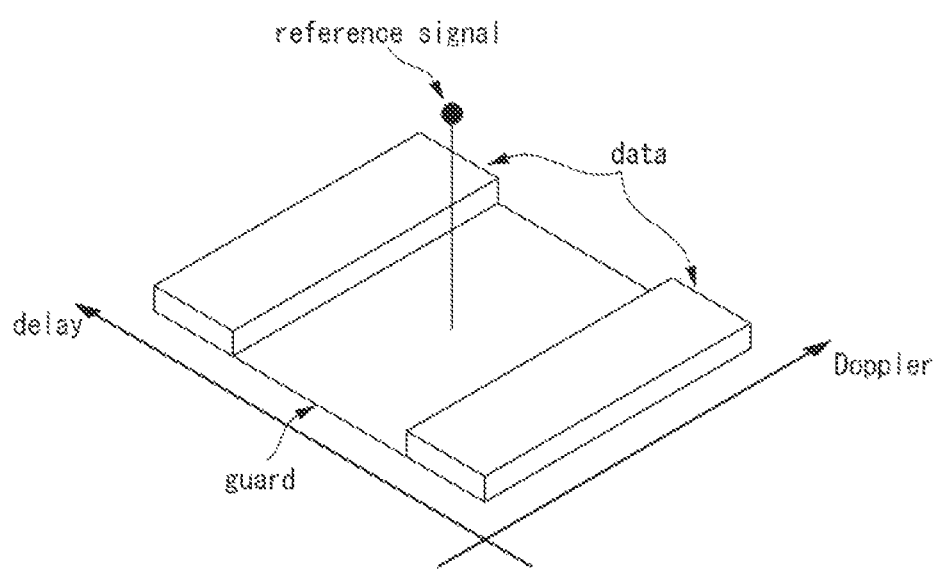
FIG. 7 is a conceptual diagram illustrating a first exemplary embodiment of a structure of a transmission signal including a two-dimensional impulse signal in the delay-Doppler domain.

FIG. 7 is a conceptual diagram illustrating a first exemplary embodiment of a structure of a transmission signal including a two-dimensional impulse signal in the delay-Doppler domain.

Referring to FIG. 7, a two-dimensional impulse signal may be used as a reference signal, and some regions of the delay-Doppler domain may be used as data periods. The periods configured for a transmission signal may include a data period, a two-dimensional impulse signal period, and a guard period. The guard period may be an empty period in order to prevent mutual interference between data and the two-dimensional impulse signal due to delay spread and/or Doppler spread in the radio channel. The power of the two-dimensional impulse signal may be increased by a power gain obtained by not assigning signals to the guard period. In this case, the power of the two-dimensional impulse signal may be increased so that there is no change in an average power of the entire transmission signal. When the structure of the transmission signal is defined as shown in FIG. 7, the reception signal in the delay-Doppler domain may be a reception signal shown in FIG. 8.

Figure 8:
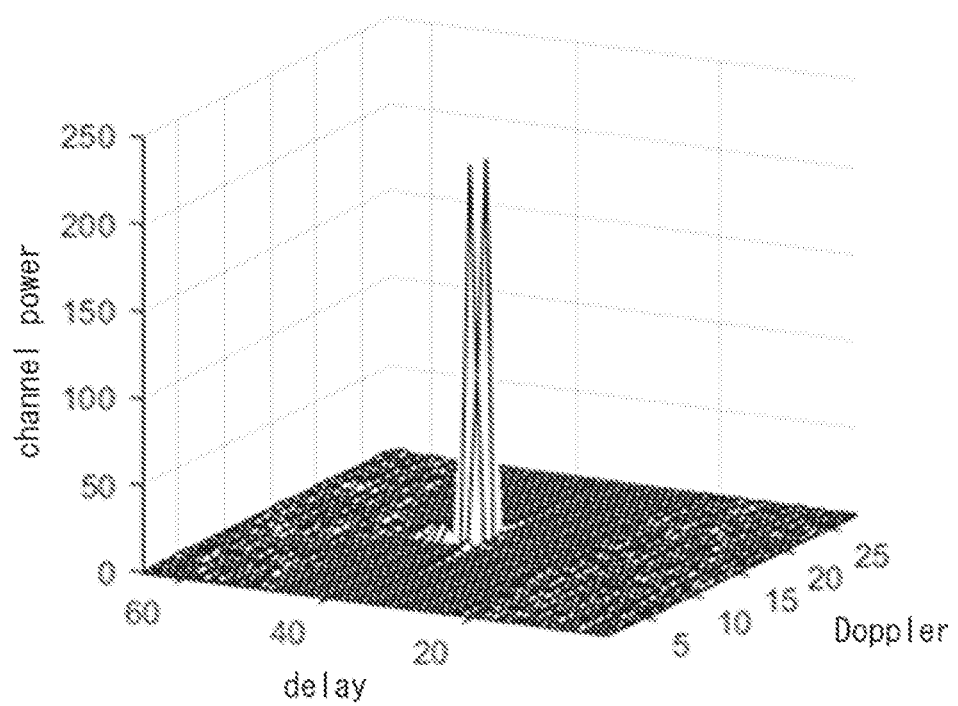
FIG. 8 is a conceptual diagram illustrating a first exemplary embodiment of a structure of a reception signal including a two-dimensional impulse signal in the delay-Doppler domain.

FIG. 8 is a conceptual diagram illustrating a first exemplary embodiment of a structure of a reception signal including a two-dimensional impulse signal in the delay-Doppler domain.

Referring to FIG. 8, the delay-Doppler domain may be divided into a data-allocated period and a channel response period based on a two-dimensional impulse signal. When the transmission signal is configured as shown in FIG. 7, the two-dimensional impulse response may be easily obtained in the delay-Doppler domain, and data transmission may be made possible, so that resource use efficiency may be good in the delay-Doppler domain. When the two-dimensional impulse signal is used as the reference signal in the delay-Doppler domain, a peak-to-average power ratio (PAPR) of the transmission signal may be increased. The PAPR may be calculated based on Equation 2 below.

$$PAPR[\text{dB}] = 10\log_{10}\left(\frac{\max\{|x(t)|^2\}}{E\{|x(t)|^2\}}\right) \quad [\text{Equation 2}]$$

Here, x(t) may represent a certain signal in the time domain. That is, the PAPR may mean the highest instantaneous power of the signal compared to the average power of the signal. When the transmission signal is generated in the manner shown in FIG. 7, the power of the transmission signal in the time domain may be the same as that of FIG. 9.

Figure 9:
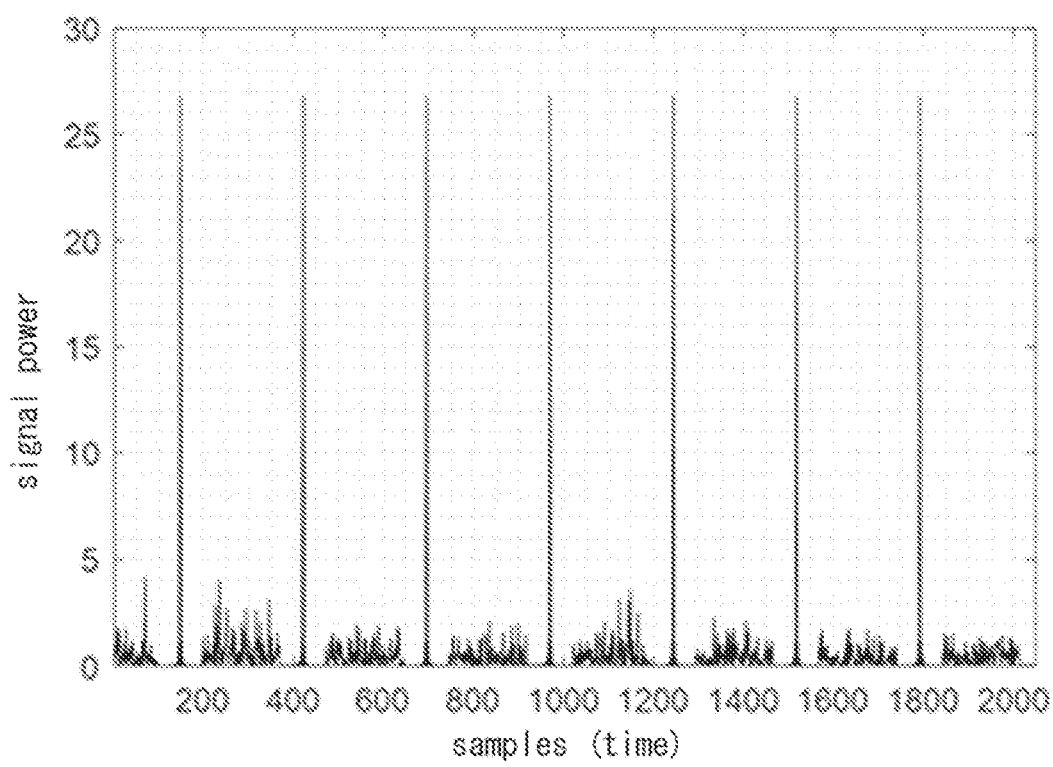
FIG. 9 is a graph illustrating a power change of a transmission signal including a two-dimensional impulse signal in the delay-Doppler domain.

FIG. 9 is a graph illustrating a power change of a transmission signal including a two-dimensional impulse signal in the delay-Doppler domain.

Referring to FIG. 9, looking at a change in an instantaneous power of a transmission signal having a two-dimensional impulse signal in the delay-Doppler domain with respect to the time domain, the instantaneous power may vary greatly. When the PAPR is high, reducing the size of the signal to keep the entire signal within a dynamic range of a digital-to-analog converter (DAC) and an analog-to-digital converter (ADC) not only deteriorates signal-to-noise ratio (SNR), but also increases signal-to-quantize-noise Ratio (SQNR). Accordingly, the overall performance of the communication system may be degraded. In addition, since a signal loss occurs even when signals having a high power value are cut, performance of the communication system may be degraded also in this case.

In exemplary embodiments, methods for designing a reference signal for channel estimation in the delay-Doppler domain will be proposed. Methods for designing a reference signal in the delay-Doppler domain will be proposed to solve the PAPR problem and the degradation of the channel estimation performance that occur when the existing two-dimensional impulse signal is used as a reference signal.

Methods for solving the PAPR problem occurring in the time domain transmission signal when a two-dimensional impulse signal is used as a reference signal in the delay-Doppler domain will be proposed. The PAPR problem may occur because the two-dimensional impulse signal has a magnitude corresponding to the total signal power of the surrounding guard period. To solve this problem, the two-dimensional impulse signal may be spread in advance in the delay-Doppler domain, and the magnitude of the two-dimensional impulse signal may be distributed. However, it may be important to design the reference signal after identifying how the signal in the delay-Doppler domain changes in the time domain rather than just spreading the two-dimensional impulse signal.

FIG. 4 may show how the time domain signal is transformed into the delay-Doppler domain signal. When the time-domain signal is transformed into the delay-Doppler-domain signal, there may be no spreading between consecutive time-domain signals, and Fourier spreading may occur between time-domain signals spaced apart at regular intervals. Conversely, when the delay-Doppler domain signal is transformed into the time domain signal, in delay-Doppler domain resources, there may be no spreading between signals adjacent along the delay axis, and Fourier spreading between signals adjacent along the Doppler axis may occur. Therefore, as in the exemplary embodiment shown in FIG. 10, the two-dimensional impulse signal in the delay-Doppler domain may be expressed as a periodic impulse train in the time domain.

Figure 10:
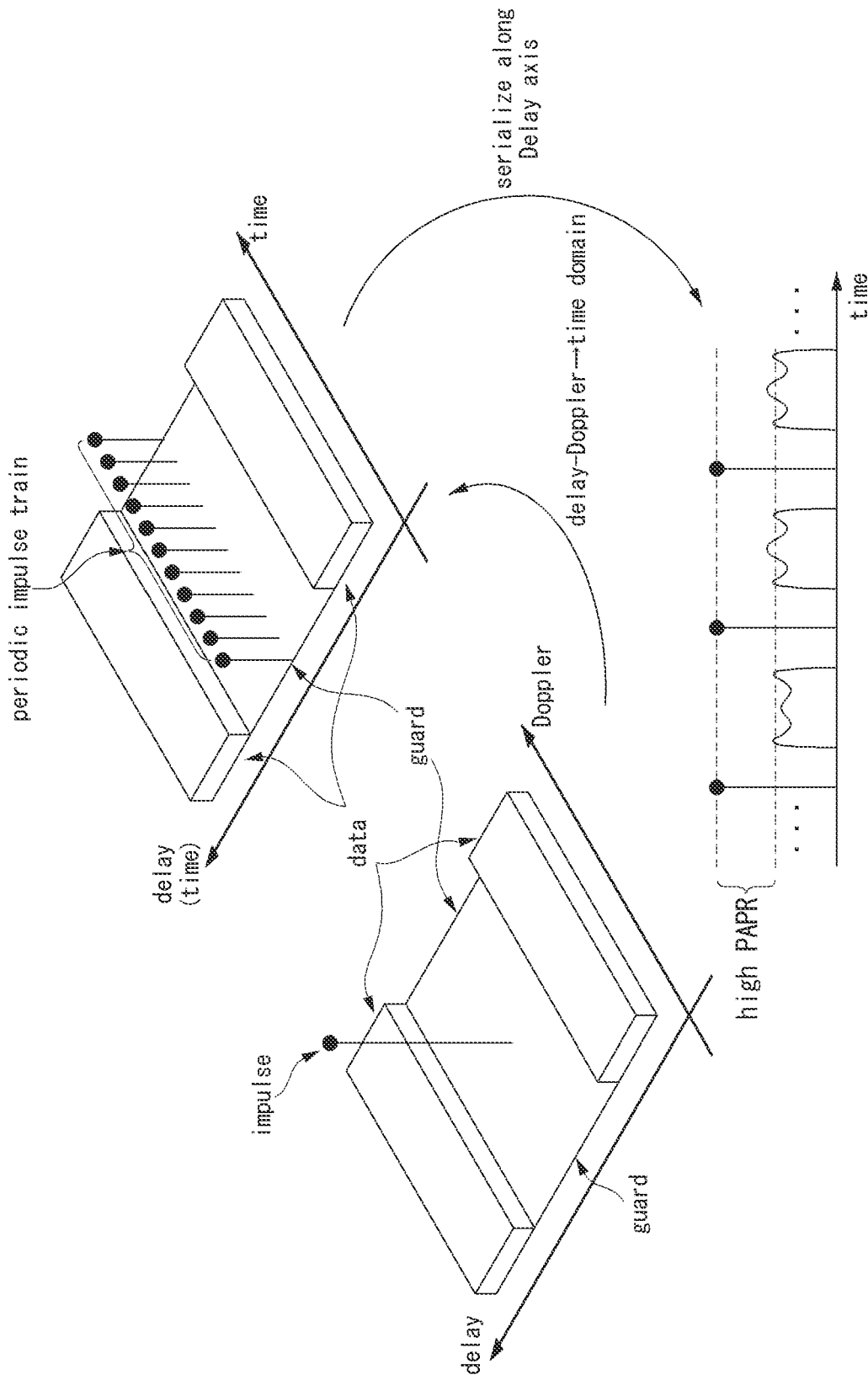
FIG. 10 is a conceptual diagram illustrating a first exemplary embodiment of a method for transforming a two-dimensional impulse signal in the delay-Doppler domain into a time domain signal.

FIG. 10 is a conceptual diagram illustrating a first exemplary embodiment of a method for transforming a two-dimensional impulse signal in the delay-Doppler domain into a time domain signal.

Referring to FIG. 10, a delay-Doppler domain signal may be spread along a Doppler axis when transformed into a time domain signal. Because of this, a periodic impulse train may appear in the time domain, and thus a PAPR problem may occur. Spreading a two-dimensional impulse signal along the Doppler axis may not help solve the PAPR problem. Therefore, even when the two-dimensional impulse reference signal is one-dimensionally spread along the delay axis instead of the Doppler axis, if the delay-Doppler domain signal is transformed into the time domain signal, a two-dimensional spreading effect in which the signal is spread not only along the delay axis but also along the Doppler axis may be obtained. Accordingly, a signal power concentrated in the periodic impulse train may be sufficiently distributed, so that the PAPR may be alleviated.

Figure 11:
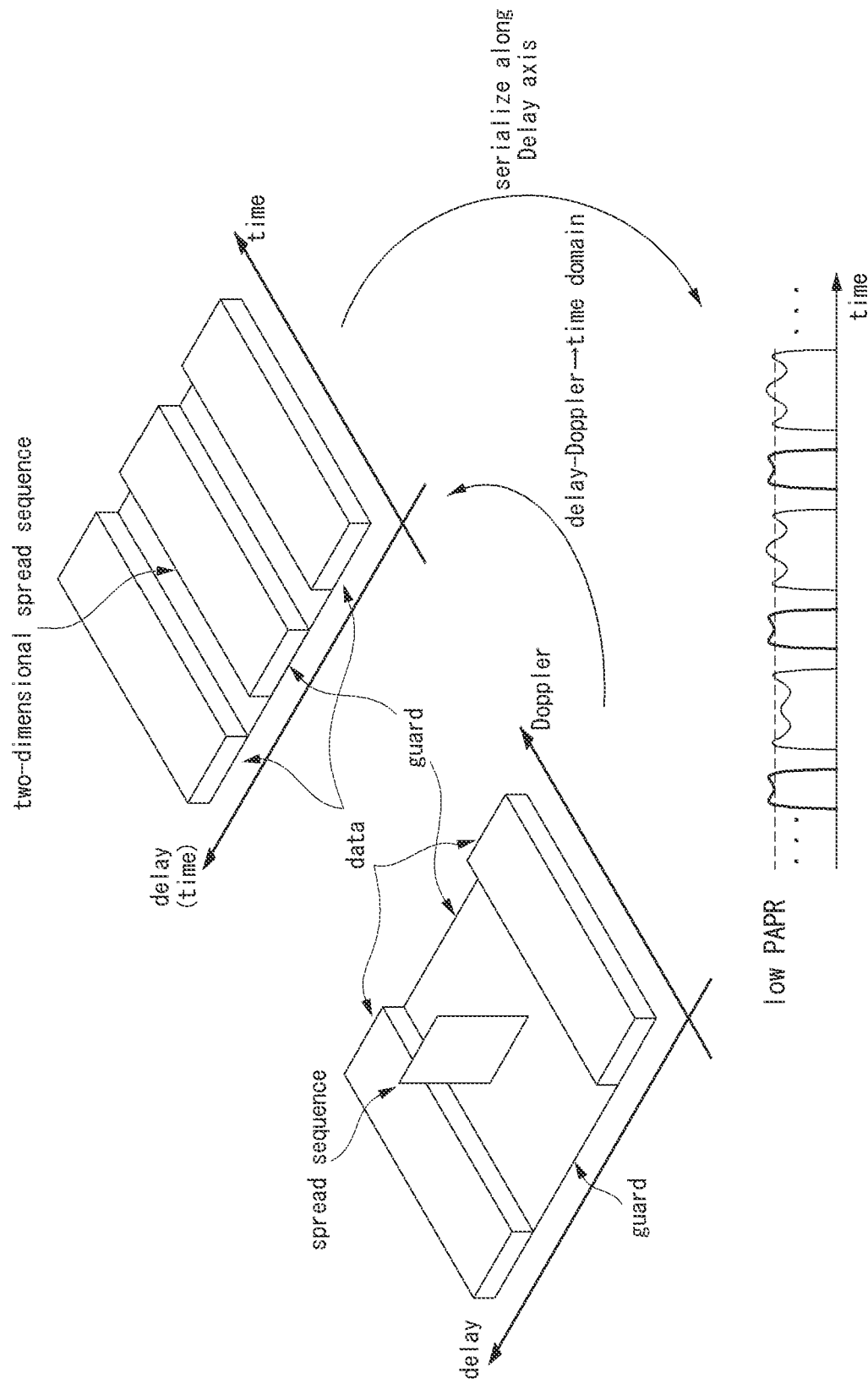
FIG. 11 is a conceptual diagram illustrating a second exemplary embodiment of a method for transforming a two-dimensional impulse signal in the delay-Doppler domain into a time domain signal.

FIG. 11 is a conceptual diagram illustrating a second exemplary embodiment of a method for transforming a two-dimensional impulse signal in the delay-Doppler domain into a time domain signal.

Referring to FIG. 11, in order to one-dimensionally spread a two-dimensional impulse signal along a delay axis in the delay-Doppler domain, various methods may be used. For example, a sequence having excellent auto-correlation characteristics may be used as a reference signal. In this case, a two-dimensional channel impulse response may be obtained in the delay-Doppler domain by performing a correlation operation based on a corresponding sequence when processing a reception signal in the delay-Doppler domain. In addition, the two-dimensional channel impulse response may be obtained in the delay-Doppler domain by arranging a pair of complementary Golay sequences having perfect auto-correlation characteristics in the delay-Doppler domain. In addition, a method of arranging an arbitrary random sequence and a channel estimation method using the arbitrary random sequence may be used.

When the two-dimensional impulse signal is used for channel estimation in the delay-Doppler domain, the PAPR of the time-domain signal may be reduced by using a one-dimensional spread sequence along the delay axis instead of the two-dimensional impulse signal. In addition, the accuracy of channel estimation when using the one-dimensional spread sequence may be similar to that of channel estimation when using the two-dimensional impulse signal.

Figure 12:
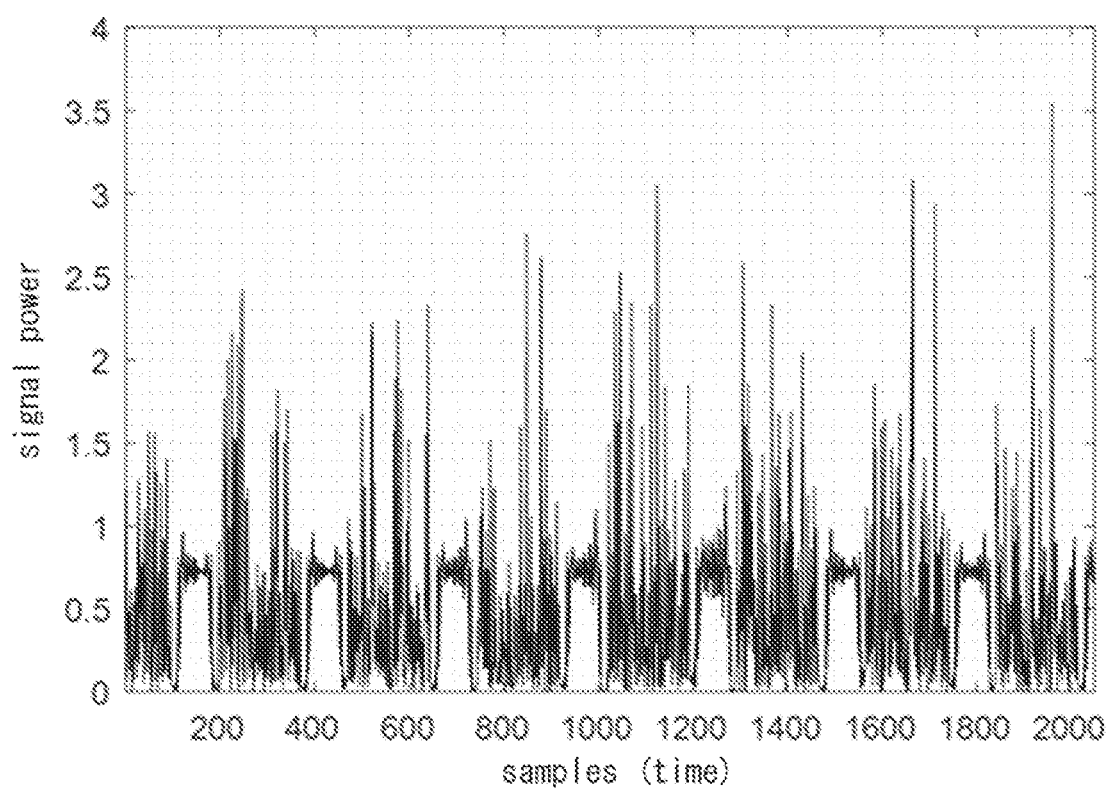
FIG. 12 is a graph illustrating a time domain power change of a transmission signal having a spread sequence reference signal in the delay-Doppler domain.

FIG. 12 is a graph illustrating a time domain power change of a transmission signal having a spread sequence reference signal in the delay-Doppler domain.

Referring to FIG. 12, when a one-dimensional spread sequence is used as a reference signal, a PAPR of a time domain transmission signal may be alleviated.

Figure 13:
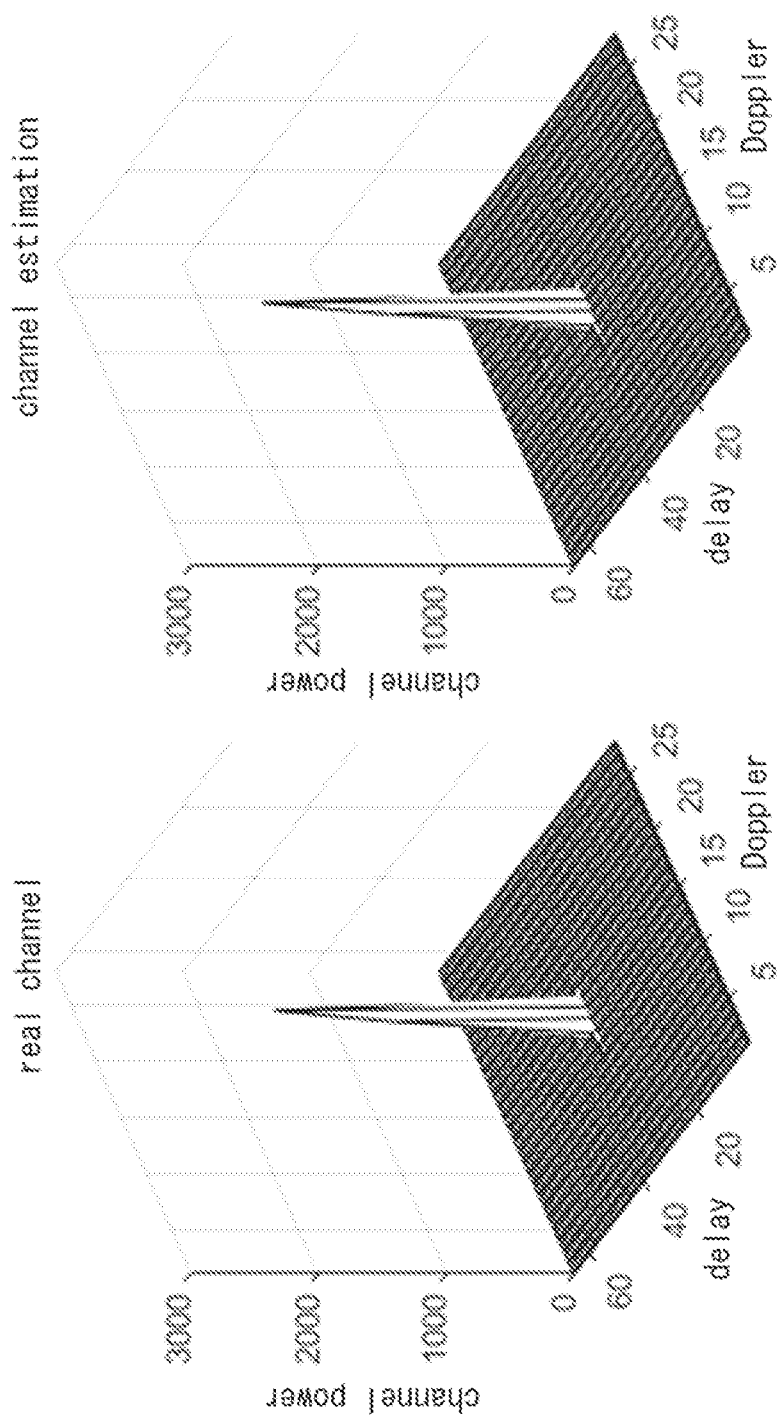
FIG. 13 is a graph illustrating a channel estimation result when a Zadoff-chu sequence is used as a reference signal.

FIG. 13 is a graph illustrating a channel estimation result when a Zadoff-chu sequence is used as a reference signal.

Referring to FIG. 13, when a Zadoff-Chu sequence having good auto-correlation characteristics is used as a reference signal, a PAPR according to channel estimation may be low. The estimated channel may be very similar to a real channel. However, since the auto-correlation characteristics of the Zadoff Chu sequence are not perfect, some noises may exist around a channel impulse response. The performance of the communication system may be degraded by some noises.

Looking at the channel estimation result, noises may be identified around the channel impulse response. These noises may be a problem of the Zadoff Chu sequence. When using a sequence having perfect auto-correlation characteristics, such as the complementary Golay sequences, as a reference signal, such the noises may not occur.

In exemplary embodiments, a sequence along the delay axis may be used as a reference signal for channel estimation in the delay-Doppler domain. For example, one sequence having excellent auto-correlation characteristics may be used as a sequence along the delay axis (e.g., one-dimensional reference signal along the delay axis). The channel may be estimated using the auto-correlation characteristics of the corresponding sequence. Alternatively, one-dimensional sequences along two or more delay axes, such as a pair of complementary Golay sequences, may be used as a reference signal. In this case, the channel may be estimated using a combination of the corresponding sequences. Alternatively, the channel may be estimated using any one-dimensional sequence along the delay axis.

Channel Estimation Method When Using a Sequence With Excellent Auto-Correlation Characteristics as a Reference Signal In the delay-Doppler domain, an auto-correlation sequence may be used as a reference signal instead of a two-dimensional impulse signal. In this case, a power corresponding to the guard period may be evenly distributed to the autocorrelation sequence instead of one impulse signal. Therefore, the PAPR problem may be solved to some extent. When an auto-correlation sequence is used as a reference signal instead of a two-dimensional impulse signal, a structure of a signal frame in the delay-Doppler domain may be the structure shown in FIG. 11. When a one-dimensional sequence along the delay axis is used as a reference signal, the PAPR may be reduced, but an additional channel estimation procedure may be required to obtain the corresponding sequence. On the other hand, when a two-dimensional impulse signal is used as a reference signal, a channel impulse response may be obtained only by separating a reference signal period without performing a separate channel estimation procedure. The reference signal period may be a region in which the impulse signal is transmitted/received.

When a sequence having very good auto-correlation characteristics (e.g., a sequence having an auto-correlation result almost identical to that of an impulse) is used, a result of an operation of separation between the reference signal and the guard period and a correlation operation on the corresponding sequence (e.g., reference signal) may be substantially the same as a result when using a two-dimensional impulse signal.

Figure 14:
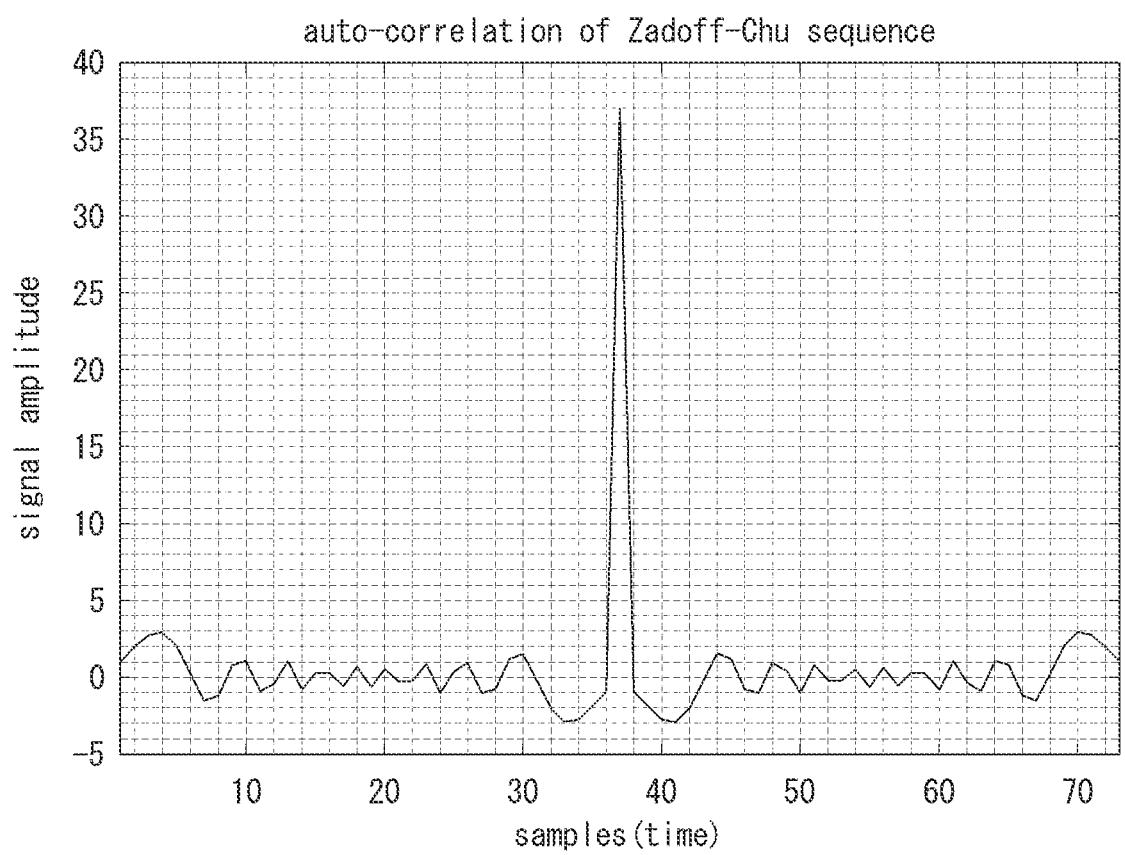
FIG. 14 is a graph illustrating an auto-correlation result of a Zadoff Chu sequence.

FIG. 14 is a graph illustrating an auto-correlation result of a Zadoff Chu sequence.

Referring to FIG. 14, the Zadoff Chu sequence may have good auto-correlation performance. Since an auto-correlation result of the Zadoff Chu sequence is not a perfect impulse, a channel estimation value in which noises exist around the reference signal may be obtained.

Figure 15:
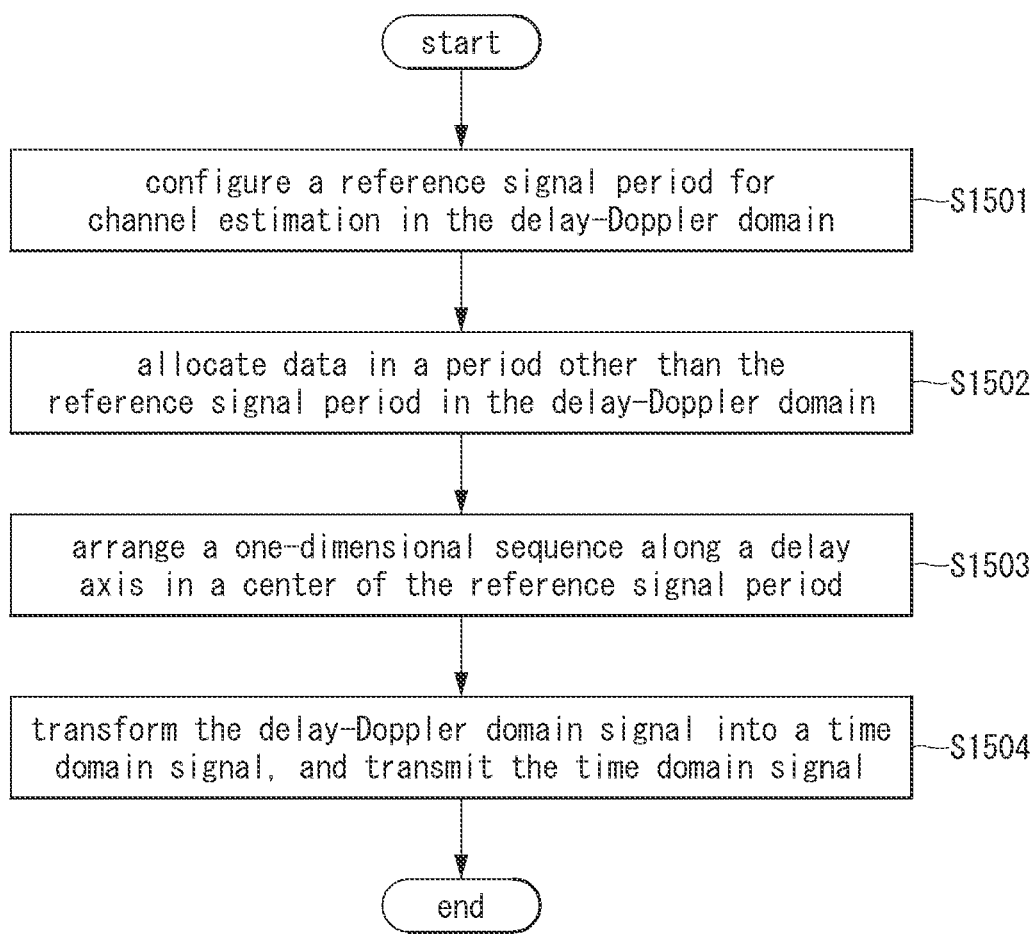
FIG. 15 is a flowchart illustrating a first exemplary embodiment of a method for transmitting a transmission signal when a sequence having excellent auto-correlation characteristics is used as a reference signal.

FIG. 15 is a flowchart illustrating a first exemplary embodiment of a method for transmitting a transmission signal when a sequence having excellent auto-correlation characteristics is used as a reference signal.

Referring to FIG. 15, the transmitter may allocate a signal in the delay-Doppler domain. The transmitter may configure (e.g. allocate) a period (hereinafter, referred to as a 'reference time period') for a reference signal in the delay-Doppler domain according to a radio channel environment (S5101). The reference time period may mean a reference time region. When the Doppler spread and/or delay spread in the radio channel is large, the transmitter may configure the reference signal period to be large. When the Doppler spread and/or the delay spread in the radio channel is small, the transmitter may configure the reference signal period to be small. The transmitter may configure the transmission signal by allocating data to the remaining period (e.g., the remaining region) excluding the reference signal period in the delay-Doppler domain (S1502).

The transmitter may arrange the reference signal in a specific region (e.g. center) within the reference signal period (S1503). The reference signal may be a sequence having auto-correlation characteristics greater than or equal to a preset reference. Since the reference signal is a one-dimensional sequence vector, the transmitter may lengthen the reference signal along the delay axis within the reference signal period, and may maintain a region in which the reference signal is not disposed within the reference signal period to be empty. When the reference signal arrangement and data allocation are completed, the transmitter may transform the delay-Doppler domain signal into a time domain signal, and transmit the time domain signal through the radio channel.

Figure 16:
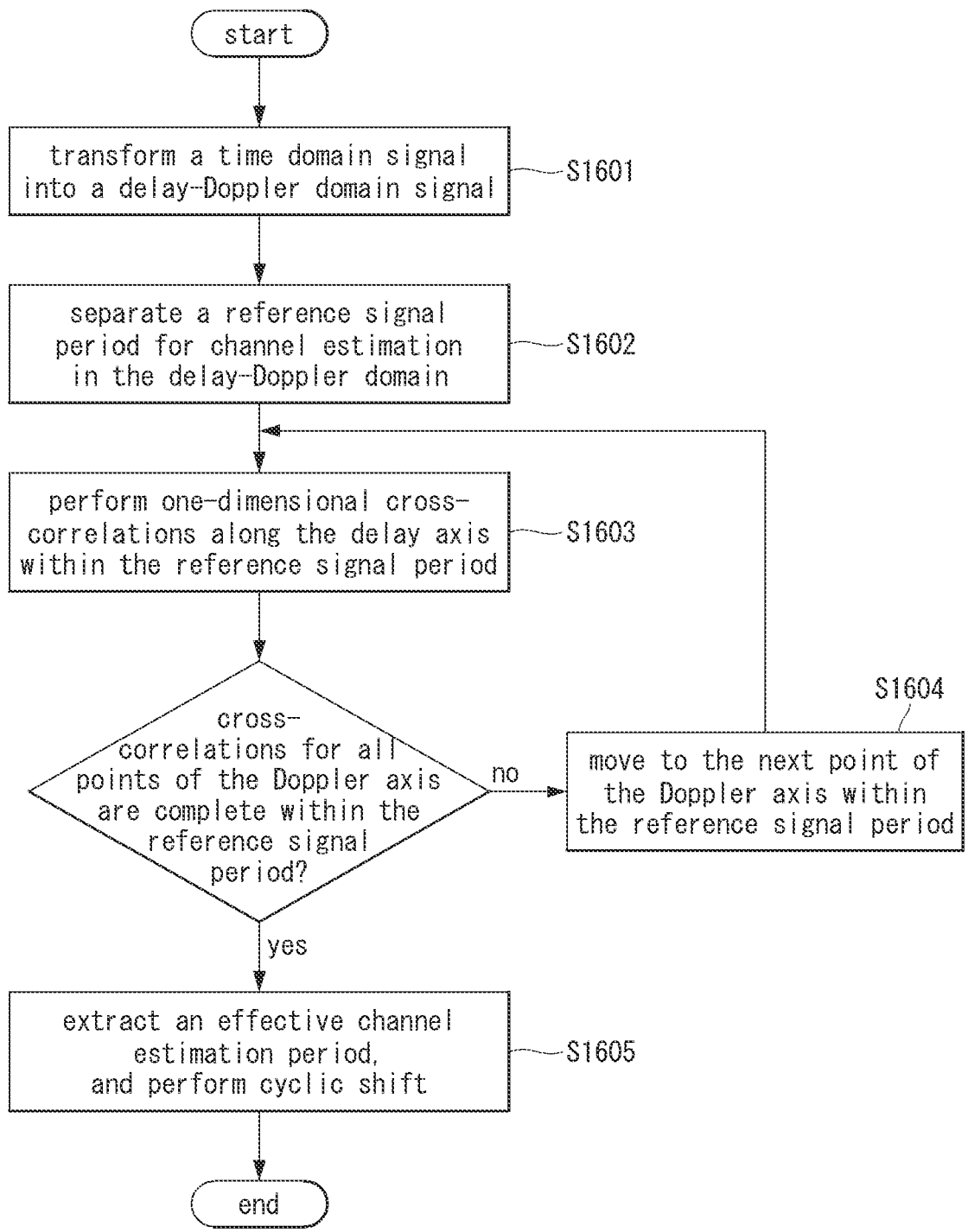
FIG. 16 is a flowchart illustrating a first exemplary embodiment of a channel estimation method when a sequence having excellent auto-correlation characteristics is used as a reference signal.

FIG. 16 is a flowchart illustrating a first exemplary embodiment of a channel estimation method when a sequence having excellent auto-correlation characteristics is used as a reference signal.

Referring to FIG. 16, the receiver may receive the time domain signal from the transmitter. The receiver may transform the time domain signal into a delay-Doppler domain signal (S1601). The receiver may separate the reference signal period (e.g., reference signal region) for channel estimation in the delay-Doppler domain (S1602). A portion of a data signal may be spread to the reference signal period while passing through the channel, which may interfere with channel estimation. In order to prevent this problem, the reference signal period may be separated excluding a portion of the guard period adjacent to the data period.

The receiver may divide the reference signal period into one-dimensional vectors along the delay axis at respective points of the Doppler axis within the reference signal period, and perform a one-dimensional cross-correlation operation between each of the vectors and the one-dimensional sequence serving as the reference signal (S1603). When the cross-correlation operations are not completed for all reference signals, the receiver may move to a next point of the Doppler axis within the reference signal period (S1604). If the step S1604 is performed, the receiver may perform again from the step S1603. For example, the receiver may perform the one-dimensional cross-correlation operation along the delay axis at a first point of the Doppler axis within the reference signal period. When the one-dimensional cross-correlation operation is completed at the first point of the Doppler axis, the receiver may perform the one-dimensional cross-correlation operation along the delay axis at the second point of the Doppler axis within the reference signal period.

When the cross-correlation operations are completed for all points of the Doppler axis within the reference signal period, the receiver may extract (e.g., determine) an effective period (e.g., effective channel estimation period) based on the results of the cross-correlation operations, and may cyclically shift the results of the cross-correlation operations along the delay axis as much as the cross-correlation outputs are delayed (S1605). This operation may be performed because the length of the cross-correlation output is different from that of the cross-correlation input, and the cross-correlation output is delayed relative to the cross-correlation input. The effective period may mean an effective region, and the effective channel estimation period may mean an effective channel estimation region. The receiver may estimate the channel based on the results of the cross-correlation operations for the effective region. When the step S1605 is completed, the channel estimation in the receiver may be completed. After completion of the channel estimation, the receiver may remove distortions due to the channel by performing a channel equalization operation. The channel equalization operation may be performed based on the channel estimation result. The cross-correlation operations on the reference signal may be performed as follows.

Figure 17:
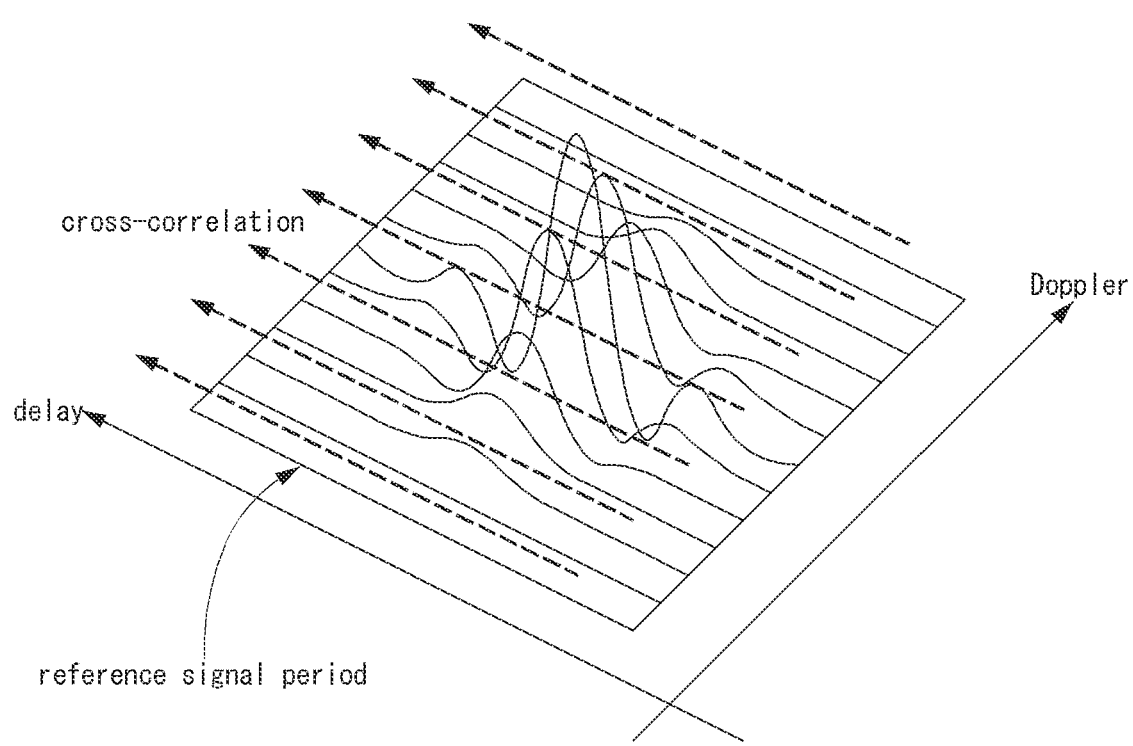
FIG. 17 is a conceptual diagram illustrating a first exemplary embodiment of a cross-correlation method for a reference signal period in the delay-Doppler domain.

FIG. 17 is a conceptual diagram illustrating a first exemplary embodiment of a cross-correlation method for a reference signal period in the delay-Doppler domain.

Referring to FIG. 17, the receiver may decompose the reference signal period into one-dimensional vectors along the delay axis, and then sequentially perform one-dimensional cross-correlation operations on the sequence (e.g., reference signal). The receiver may perform the cross-correlation operation on the reference signal by combining the results of the one-dimensional cross-correlation operations for points on the Doppler axis.

When the channel estimation method using a sequence having excellent auto-correlation characteristics as a reference signal is used, as shown in FIG. 14, since the auto-correlation characteristics of the corresponding sequence are not perfect, noises may occur around the channel impulse response. Due to the noises, an inaccurate channel estimation result may be obtained, and the performance of the communication system may be degraded. However, compared with the method of using a two-dimensional impulse signal as a reference signal, a PAPR problem may not occur due to the method of using a sequence with excellent auto-correlation characteristics as a reference signal.

Channel Estimation Method When Using a Combination of Two or More Sequences, Such as Complementary Golay Sequences, as a Reference Signal The channel estimation method when a combination of two or more sequences, such as complementary Golay sequences, is used as a reference signal may be referred to as a 'complementary Golay sequence scheme' or 'complementary Golay sequence method'. The complementary Golay sequence scheme may be one of auto-correlation sequence schemes. In order to solve the noises occurring because the auto-correlation pilot sequence does not have perfect auto-correlation characteristics, the complementary Golay sequence scheme may be used.

Figure 18:
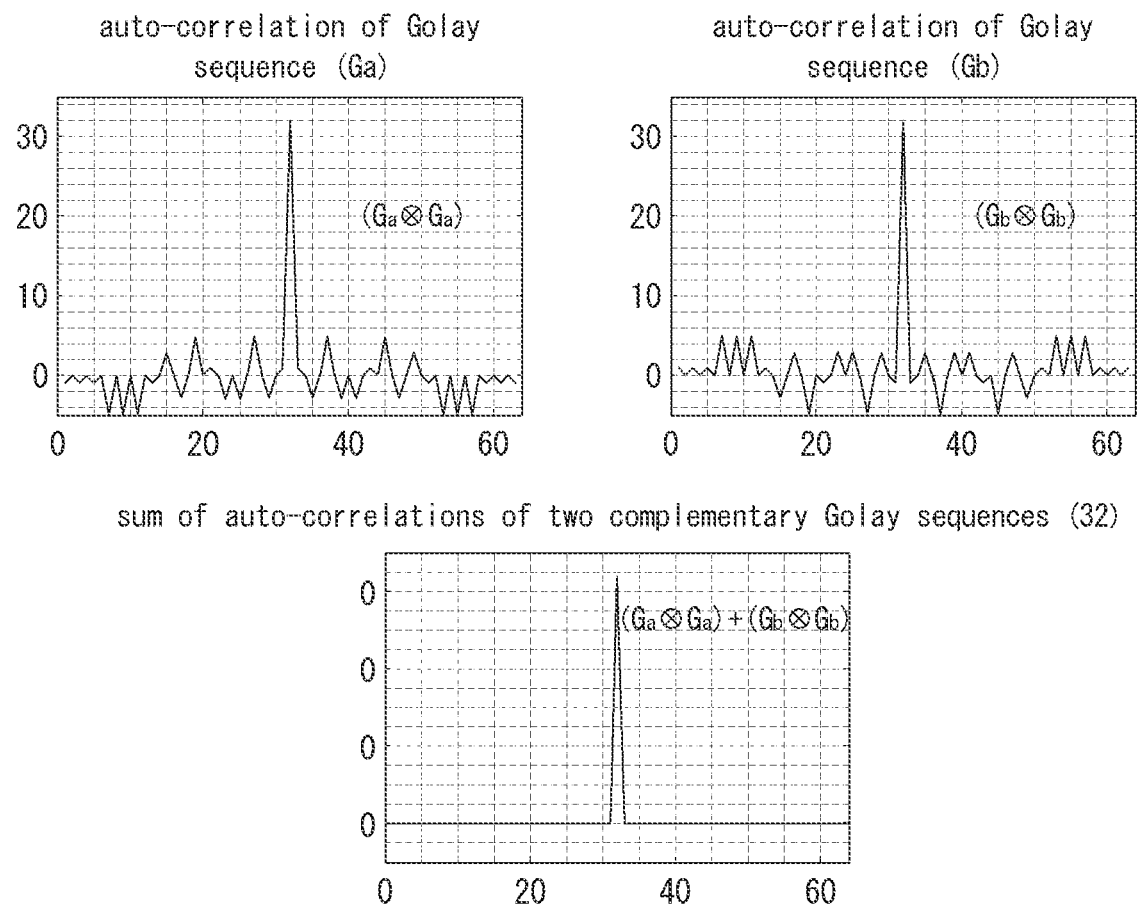
FIG. 18 is a graph illustrating characteristics of complementary Golay sequences.

FIG. 18 is a graph illustrating characteristics of complementary Golay sequences.

Referring to FIG. 18, although the auto-correlation characteristics of each of Golay sequences is not perfect, a sum of auto-correlation results of two paired Golay sequences (e.g., complementary Golay sequences) may have perfect auto-correlation characteristics. Due to this feature, when complementary Golay sequences are used as the reference signal, the above-described disadvantages of the auto-correlation sequence may be overcome.

Figure 19:
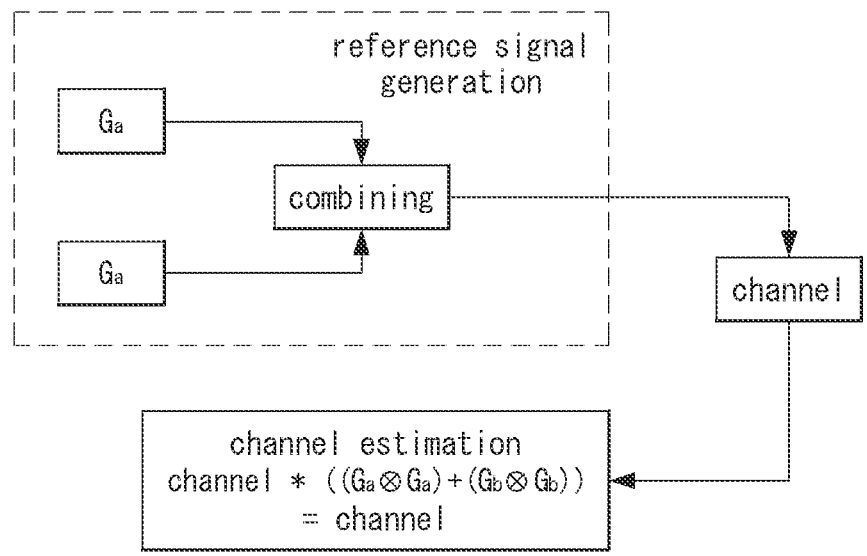
FIG. 19 is a conceptual diagram illustrating a first exemplary embodiment of a channel estimation method using complementary Golay sequences.

FIG. 19 is a conceptual diagram illustrating a first exemplary embodiment of a channel estimation method using complementary Golay sequences.

Referring to FIG. 19, in order to use complementary Golay sequences as a reference signal for channel estimation, a pair of two Golay sequences should independently pass through the channel. In order to satisfy this condition, two independent reference signal periods may be configured in the delay-Doppler domain, and each of the two Golay sequences may be assigned to the independent reference signal period.

Figure 20:
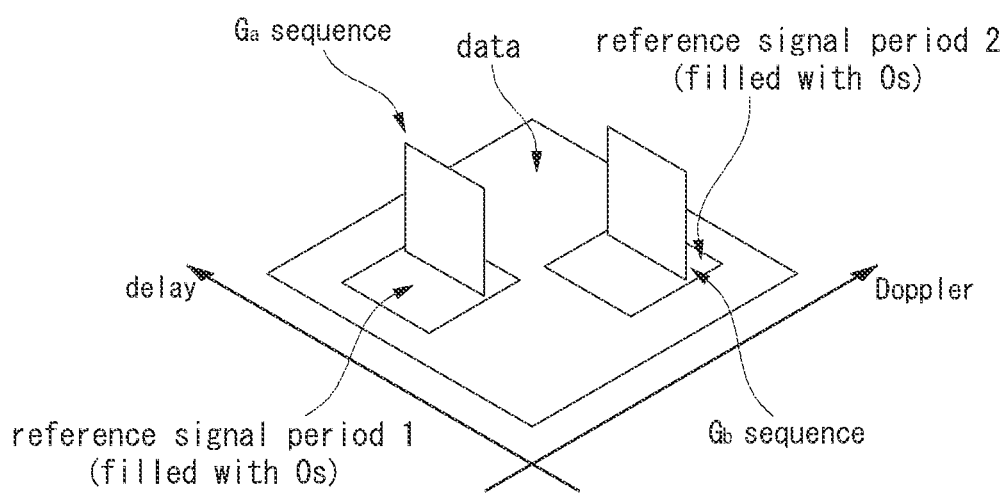
FIG. 20 is a conceptual diagram illustrating a first exemplary embodiment of a method of arranging a pair of complementary Golay sequences in the delay-Doppler domain.

FIG. 20 is a conceptual diagram illustrating a first exemplary embodiment of a method of arranging a pair of complementary Golay sequences in the delay-Doppler domain.

Referring to FIG. 20, in the delay-Doppler domain, each Golay sequence may be disposed in each of the reference signal periods independent from each other. Since the Golay sequences received at the receiver through the channel may interfere with each other due to channel spreading, the reference signal period of each Golay sequence may be completely separated for complete independence. In addition, it may be preferable to allocate the reference signal period for each Golay sequence to be larger than the delay and/or Doppler spread of the channel.

When the complementary Golay sequences are used as the reference signal, a method of generating a transmission signal may be similar to the method shown in FIG. 15. However, in the delay-Doppler domain, two or more reference signal periods for channel estimation may be configured (e.g., allocated), and each of the complementary Golay sequences may be arranged in a specific region (e.g., center) of each reference signal period one by one.

Figure 21:
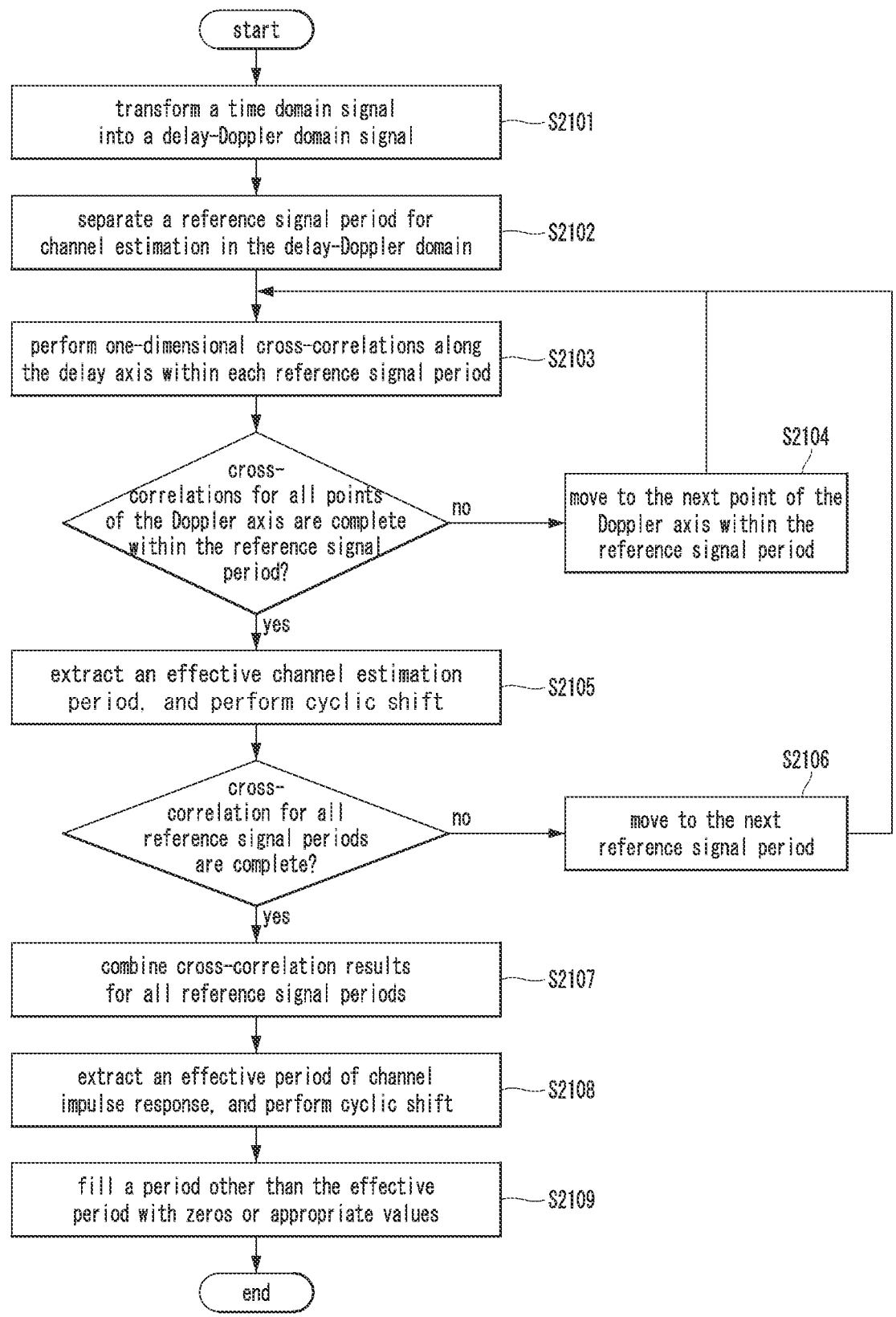
FIG. 21 is a flowchart illustrating a first exemplary embodiment of a channel estimation method when complementary Golay sequences are used as a reference signal.

FIG. 21 is a flowchart illustrating a first exemplary embodiment of a channel estimation method when complementary Golay sequences are used as a reference signal.

Referring to FIG. 21, the receiver may receive a time domain signal from the transmitter. The receiver may transform the time domain signal into a delay-Doppler domain signal (S2101). The receiver may separate two or more reference signal periods for channel estimation in the delay-Doppler domain (S2102). The receiver may perform a one-dimensional cross-correlation operation along the delay axis for each reference signal period (S2103). For example, the receiver may perform a cross-correlation operation using each corresponding Golay sequence along the delay axis for each of two reference signal periods allocated to the complementary Golay sequences. When the cross-correlation operations are not completed for all reference signals, the receiver may move to a next point of the Doppler axis within the reference signal period (S2104). If the step S2104 has been performed, the receiver may perform the operations again from the step S2103. For example, the receiver may perform a one-dimensional cross-correlation operation along the delay axis at the first point of the Doppler axis within the reference signal period. When the one-dimensional cross-correlation operation is completed at the first point of the Doppler axis, the receiver may perform the one-dimensional cross-correlation operation along the delay axis at the second point of the Doppler axis within the reference signal period.

When the cross-correlation operations for all points of the Doppler axis within the reference signal period are completed, the receiver may extract (e.g., determine) an effective period (e.g., effective channel estimation period) based on the results of the cross-correlations, and may cyclically shift the cross-correlation results along the delay axis as much as the cross-correlation outputs are delayed (S2105). When the cross-correlation operations for all reference signal periods are not completed, the receiver may prepare to perform an operation for the next reference signal period (S2106). When the step S2106 is performed, the receiver may perform operations from the step S2103 in the next reference signal period. For example, when the cross-correlation operation for the reference signal period 1 is completed, the receiver may perform the cross-correlation operation for the reference signal period 2.

When the cross-correlation operations for all reference signal periods are completed, the receiver may obtain a sum of the results of the cross-correlation operations in all the reference signal periods (e.g., two reference signal periods) (S2107). In the cross-correlation operation using the complementary Golay sequences, a valid result may occur at a position delayed by the length of the Golay sequence, and in this reason, the receiver may appropriately extract (e.g., determine) a period in which an effective channel impulse response is generated (e.g., effective period of a channel impulse response) (S2108). After the effective period of the channel impulse response is determined, a cyclic shift operation may be performed. The receiver may fill a period other than the period in which the channel estimation value is obtained by using the complementary Golay sequences (e.g., effective period of the channel impulse response) with 0's or appropriate values (e.g., values according to interpolation) (S2109). The receiver may complete the overall channel estimation by performing the above-described operations.

Figure 22:
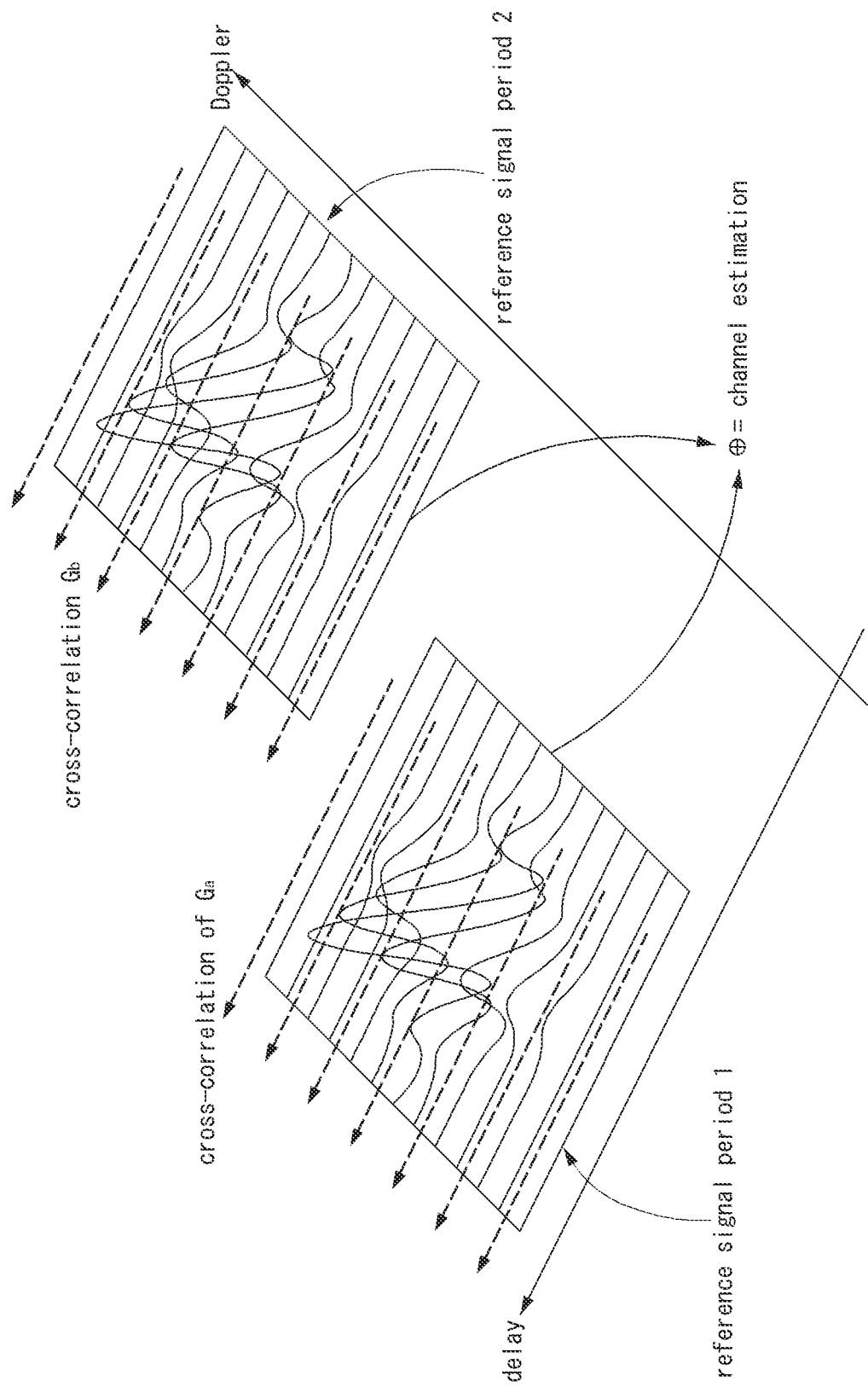
FIG. 22 is a conceptual diagram illustrating a first exemplary embodiment of a cross-correlation operation and a channel estimation operation for two reference signal periods.

FIG. 22 is a conceptual diagram illustrating a first exemplary embodiment of a cross-correlation operation and a channel estimation operation for two reference signal periods.

The step S2103 shown in FIG. 21 and the step S2107 shown in FIG. 21 may be performed based on operations shown in FIG. 22.

In the channel estimation operation, the step S2108 may be performed to resolve a mismatch of resource periods having valid data and the delay of the channel impulse response occurring after performing the correlation operations. After the correlation operations are performed on the reception signal by using the corresponding Golay sequences, the result values of the correlation operations may be longer than the length of the original reception signal. Therefore, it may be necessary to extract only the effective period (e.g., the effective period of the channel impulse response) based on the results of the correlation operations. In addition, since a position at which the impulse is generated due to the result of the auto-correlation is delayed by the length of the sequence compared to a start time of the correlation operation, an operation for appropriately extracting the effective period may be required. Accordingly, the step S2108 may be performed.

Figure 23:
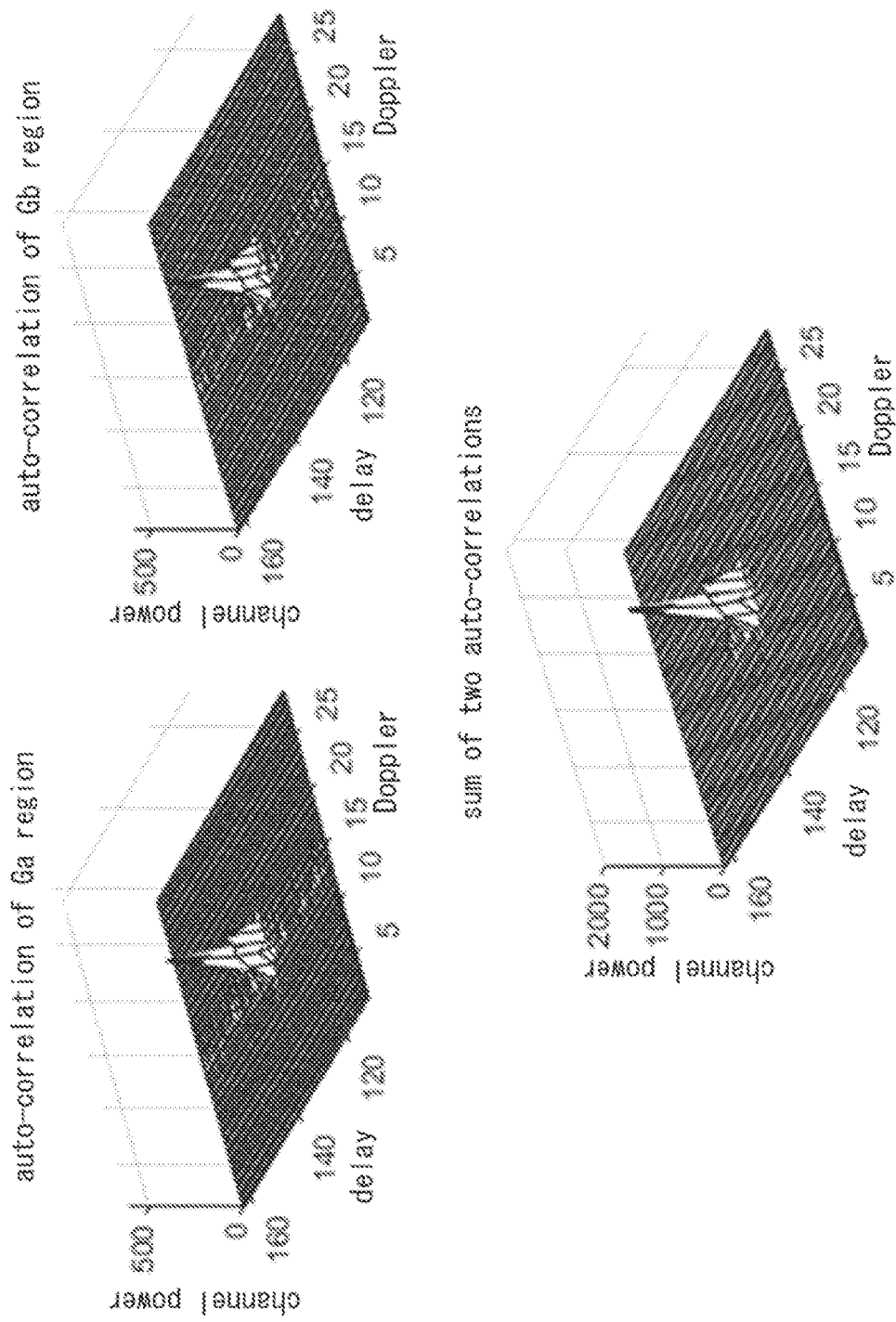
FIG. 23 is a graph illustrating a cross-correlation result of each Golay sequence and a sum of cross-correlation results.

FIG. 23 is a graph illustrating a cross-correlation result of each Golay sequence and a sum of cross-correlation results.

Referring to FIG. 23, an auto-correlation result (or, cross-correlation result) of each Golay sequence may include not only a channel impulse response but also ambient noises. A sum of the auto-correlation results (or cross-correlation results) of the two Golay sequences may include the channel impulse response without ambient noises.

Figure 24:
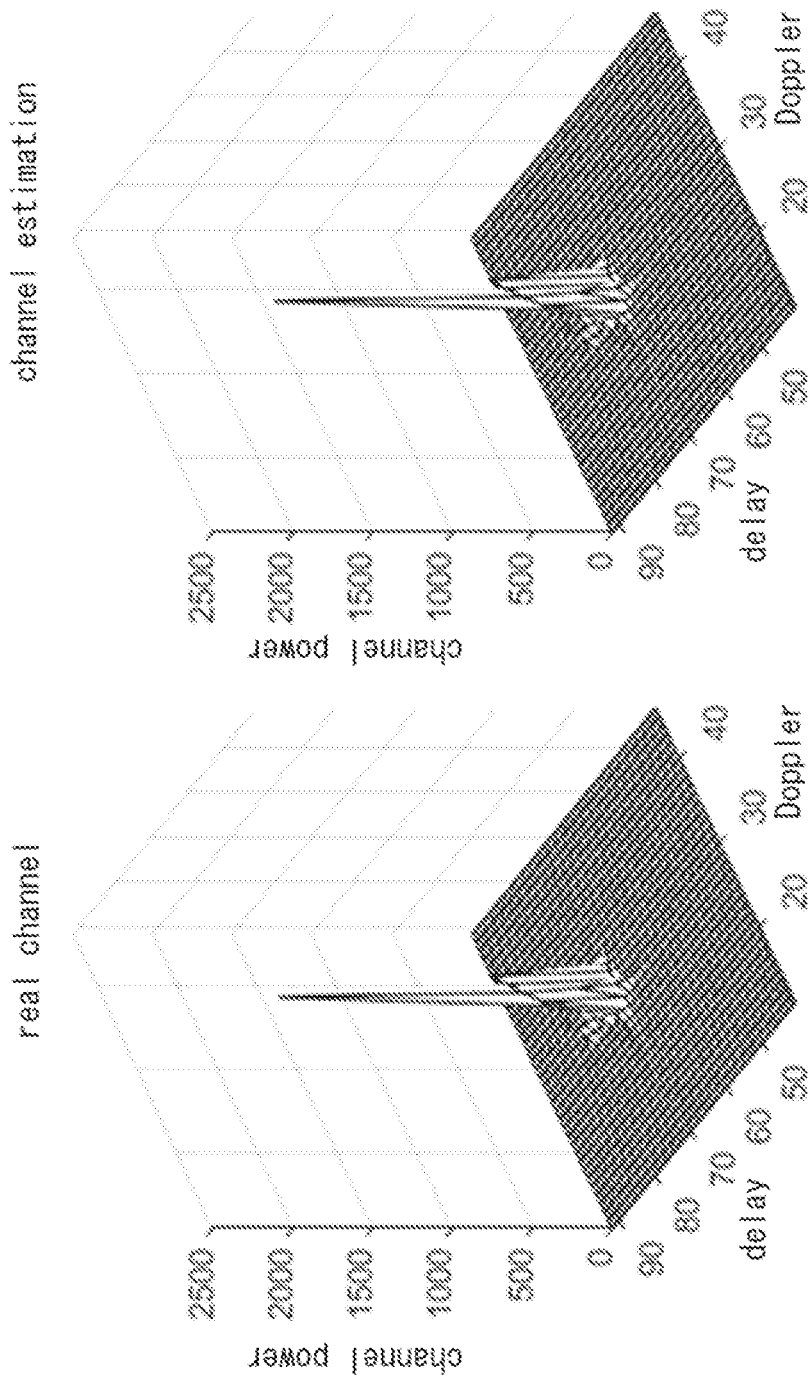
FIG. 24 is a graph illustrating a channel estimation result using a real channel and complementary Golay sequences.

FIG. 24 is a graph illustrating a channel estimation result using a real channel and complementary Golay sequences.

Referring to FIG. 24, the channel response using the complementary Golay sequences may be almost identical to the real channel response.

In conclusion, the channel estimation method using the complementary Golay sequences as a reference signal may solve the PAPR problem like the channel estimation method using the auto-correlation sequence as a reference signal. Unlike the result of performing channel estimation using an auto-correlation sequence as a reference signal, when the complementary Golay sequences are used as a reference signal, a clean channel estimation result without ambient noises may be obtained due to the perfect auto-correlation characteristics of the complementary Golay sequences. However, when the complementary Golay sequences are used as a reference signal, since two or more reference signal periods should be allocated, interference may occur between two or more reference signal periods may occur in an environment in which the delay spread and/or Doppler spread of the channel are very large. Since resources corresponding to more than twice the channel spread period are allocated as the reference signal period, resource use efficiency may not be good.

Channel Estimation Method When Using a Random Sequence as a Reference Signal

In addition to the method using the auto-correlation characteristics of the sequence, as another method for reducing the PAPR, a method of obtaining a channel estimation value by directly demodulating a reference signal period in the delay-Doppler domain may be used.

Also in this method, a reference signal in form of a sequence may be used. In order to describe this method, a communication system model in the delay-Doppler domain will be described. First, characteristics of a time domain signal may be defined, and a system model in the frequency-time domain and a system model in the delay-Doppler domain may be sequentially defined from the characteristics of the time domain signal. A transmission signal in the time domain may be defined as x(t), a reception signal in the time domain may be defined as y(t), and an impulse response of a time-varying channel in the time domain may be defined as h(t). A relationship between the above-described signals may be defined as in Equation 3 below.

$$y(t) = conv(h(t), x(t)) = \sum_\tau h(\tau)x(t-\tau)$$ [Equation 3]

When an OFDM modulation/demodulation system is used, the time-domain signal may be decomposed into OFDM symbol units each including a cyclic prefix (CP), and the decomposed time-domain signal may be expressed as sampled signals. This operation may be defined as in Equation 4 below.

$$x_t^m(n)=x((mN'+n)T_s)$$

$$y_t^m(n)=y((mN'+n)T_s)$$

$$h_t^m(n,l)=h(t_{m,n}+lT_s)$$

$$0 \leq n < N', 0 \leq m < M, 0 \leq l < L$$ [Equation 4]

Equation 4 may mean that a transmission signal and a reception signal for the m-th OFDM symbol are sampled with a $T_s$ period. $T_s$ may be a sampling period, N' may be the length of an OFDM symbol including a CP, and M may be the number of OFDM symbols. $x_t^m(n)$ may be a time domain sampling signal of the transmission signal. $y_t^m(n)$ may be a time domain sampling signal of the reception signal. Each of $x_t^m(n)$ and $y_t^m(n)$ may be the n-th sampling signal of the m-th OFDM symbol. $h_t^m(n,l)$ may be a sampling signal for the impulse response h(t) of the time-varying channel.

Here, L may indicate the length of the channel having an effective size when the impulse response is sampled with $T_s$. $t_{m,n}$ may indicate a time corresponding to the n-th sample of the m-th OFDM symbol. N may be the number of samples of an OFDM symbol excluding a CP. and each of $x_t^m(n)$ and $y_t^m(n)$ may be a signal decomposed in an OFDM unit. $x_t^m(n)$ and $y_t^m(n)$ may be defined as $x_t^m$ and $y_t^m$ when they are expressed as one-dimensional column vectors with respect to =0, 1, . . . , N−1. In this case, as shown in Equation 5 below, a relationship between the time domain transmission signal and the time domain reception signal for the m-th OFDM symbol may be defined.

$$y_t^m = H_t^m x_t^m$$

$$0 \leq m < M$$ [Equation 5]

In Equation 5, $H_t^m$ may be basically in form of a circulant matrix.

Figure 25:
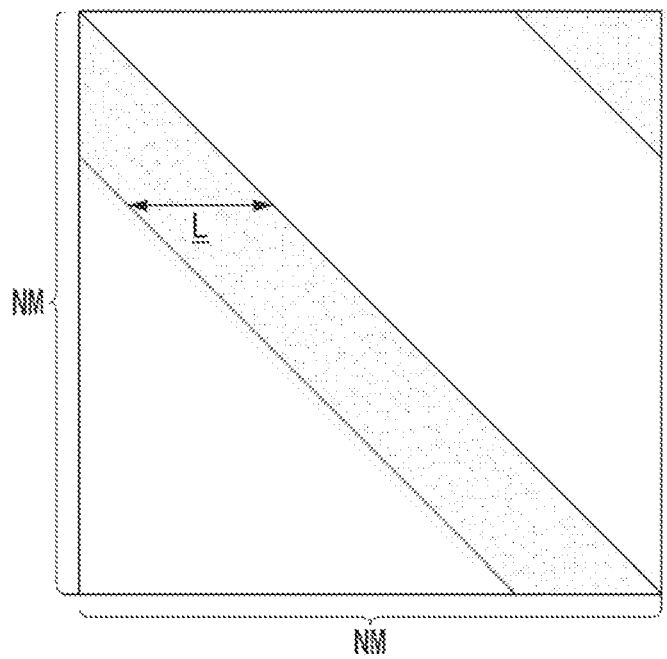
FIG. 25 is a conceptual diagram illustrating a first exemplary embodiment of a circulant matrix.

FIG. 25 is a conceptual diagram illustrating a first exemplary embodiment of a circulant matrix.

Referring to FIG. 25, $H_t^m$ in Equation 5 may be in form of a circulant matrix shown in FIG. 25. When the radio environment changes over time, $H_t^m$ may be a time-varying matrix whose values change according to a time t. Not only the value may change for each OFDM signal, but also the value may change for each row in the matrix. Therefore, the circular matrix form may not be maintained.

In summary, the relationship between the reception signal and the transmission signal in the time domain may be a convolutional relationship. When the transmission signal and the reception signal are expressed as one-dimensional column vectors, and the channel is expressed similarly to a circulant matrix form, a reception vector may be expressed as a product of a transmission vector and the channel matrix. If the radio environment does not change within one OFDM symbol, the channel matrix may be exactly in form of a circulant matrix. If the radio environment changes over time, the channel matrix may not be exactly in form of a circulant matrix.

In order to transform the communication system model from the time domain to the frequency-time domain, it may be convenient to make the assumption that the channel does not change within one OFDM symbol. Under the assumption, $H_t^m$ may be an exact circulant matrix. As shown in Equation 6 below, the circulant matrix may be decomposed into a combination of a diagonal matrix and a Discrete Fourier Transform (DFT) matrix.

$$H_{circulant} = F^{-1} H_{diagonal} F$$ [Equation 6]

In Equation 6, $H_{circulant}$ may be a circulant matrix, F may be a DFT matrix, and $H_{diagonal}$ may be a diagonal matrix. When the channel does not change within one OFDM symbol, Equation 7, which is an equation in the frequency-time domain, may be obtained.

$$y_{tf}^m = Fy_t^m = FH_t^m x_t^m = F(F^{-1}H_{tf}^m F)$$
$$x_t^m = H_{tf}^m \{Fx_t^m\} = H_{tf}^m x_{tf}^m$$  [Equation 7]

In Equation 7, $y_{tf}^m$ and $x_{tf}^m$ may be the m-th reception OFDM symbol column vector and the m-th transmission OFDM symbol column vector, respectively, F may be a DFT matrix, and $H_{tf}^m$ may be a channel matrix corresponding to the m-th OFDM transmission/reception signal. $H_{tf}^m$ may have a diagonal matrix form. If Equation 7 is rewritten for all OFDM symbols, Equation 8 below may be obtained.

$$y_{tf} = \begin{bmatrix} y_{tf}^0 \\ y_{tf}^1 \\ \vdots \\ y_{tf}^{M-1} \end{bmatrix} = \begin{bmatrix} H_{tf}^0 & 0 & \cdots & 0 \\ 0 & H_{tf}^1 & \cdots & 0 \\ \vdots & \vdots & \ddots & \vdots \\ 0 & 0 & \cdots & H_{tf}^{M-1} \end{bmatrix} \begin{bmatrix} x_{tf}^0 \\ x_{tf}^1 \\ \vdots \\ x_{tf}^{M-1} \end{bmatrix} = H_{tf}x_{tf}$$  [Equation 8]

In Equation 8, each of $x_{tf}$ and $y_{tf}$ may be a vector obtained by serializing each of $x_{tf}^m$ and $y_{tf}^m$, which is a column vector, in a column direction. Since $H_{tf}^m$ are all diagonal matrices, the entire channel matrix $H_{tf}$ may also be a diagonal matrix. Accordingly, in the frequency-time domain, the transmission signal and the reception signal may be simplified in form of a scalar product with each diagonal element of the channel matrix without complex matrix operation. In this case, Equation 9 below may be defined.

$$y_{tf}^m(n) = h_{tf}^m(n,n) \cdot x_{tf}^m(n)$$

$$0 \le n < N$$

$$0 \le m < M$$  [Equation 9]

In Equation 9, $x_{tf}^m(n)$ and $y_{tf}^m(n)$ may be the n-th vector elements of the vectors $x_{tf}^m$ and $y_{tf}^m$, respectively, and $h_{tf}^m(n,n)$ may be a (n,n)-th matrix element of $H_{tf}^m$ which is a square matrix. Equation 9 may be rewritten in a matrix form by using a Hadamard product (∘) in the frequency-time domain as shown in Equation 10 below.

$$y_{tf}^m = \text{diag}(H_{tf}^m) \circ x_{tf}^m, \, 0 \le m < M$$  [Equation 10]

$$Y_{tf} = [y_{tf}^0 \, y_{tf}^1 \, \cdots \, y_{tf}^{M-1}]$$

$$= [\text{diag}(H_{tf}^0) \, \text{diag}(H_{tf}^1) \, \cdots \, \text{diag}(H_{tf}^{M-1})] \circ [x_{tf}^0 \, x_{tf}^1 \, \cdots \, x_{tf}^{M-1}]$$

$$= \hat{H}_{tf} \circ X_{tf}$$

In Equation 10, $X_{tf}$ and $Y_{tf}$ may be matrices in which $x_{tf}^m$ and $y_{tf}^m$, which are column vectors, are arranged in a row direction, respectively, and $\hat{H}_{tf}$ may be a matrix in which column vectors taking only diagonal elements of the matrix $H_{tf}^m$ are arranged in a row direction.

The above-described result may be a result in a situation where there is no change in the channel according to time. In general, since a high-speed mobile environment is a radio environment that changes with time, a channel may change even within one OFDM symbol. In this case, in the equation of the m-th OFDM transmission/reception signal, $H_t^m$ may not be a circulant matrix, and a result of decomposition (e.g., decomposed matrix) of $H_t^m$ into a DFT matrix may not be a diagonal matrix. That is, in addition to the diagonal elements in $H_{tf}^m$, off-diagonal elements may also have non-zero values. Accordingly, the reception signal may be defined as a combination between the transmission signal and an interference signal as shown in Equation 11 below.

$$y_{tf}^m(n) = h_{tf}^m(n,n) \cdot x_{tf}^m(n) + \sum_{l \ne n}(h_{tf}^m(n,l) \cdot x_{tf}^m(l))$$  [Equation 11]

$$0 \le m < M$$

$$0 \le n, l < N$$

If Equation 11 is expressed in a matrix form, Equation 11 may be simplified as Equation 12 below.

$$Y_{tf} = \hat{H}_{tf} \circ X_{tf} + \text{interference}$$  [Equation 12]

In Equation 12, the interference may be a value corresponding to $\Sigma_{l \ne n}(h_{tf}^m(n,l) \cdot x_{tf}^m(l))$, which is not related to $x_{tf}^m(n)$ among $y_{tf}^m(n)$.

In summary, if a radio channel is an environment that does not change within an OFDM symbol, the reception signal in the frequency-time domain may be accurately expressed as a Hadamard product of the transmission signal and the channel. When a radio channel changes over time, if the reception signal is expressed as a Hadamard product of the transmission signal and the channel, an error may occur due to interference components.

In order to easily transform a frequency-time domain signal to a delay-Doppler domain signal, it may be useful to make an assumption that a radio environment does not change. In order to transform a frequency-time domain signal into a delay-Doppler domain signal, a spreading operation using a DFT matrix along the time axis and frequency axis may be required. The spreading operation may be defined as in Equation 13 below.

$$y_{Dd}^m(n) = \sum_{k=0}^{M-1}\left(\sum_{l=0}^{N-1} y_{tf}^k(l)e^{j2\pi nl/N}\right)e^{-j2\pi mk/M},$$  [Equation 13]

$$0 \le m < M, \, 0 \le n < N$$

In Equation 13, $y_{tf}^m(n)$ may be the (n+mN)-th vector element of $y_{tf}$. $y_{tf}^m(n)$ may be the n-th component of the m-th reception OFDM symbol $y_{tf}^m$. $y_{Dd}^m(n)$ may be the (n+mN)-th vector element of the reception signal $y_{Dd}$ transformed into a delay-Doppler domain signal. If Equation 13 is expressed in a matrix form by using a Kronecker product ⊗, Equation 14 below may be derived.

$$y_{Dd} = (F_M \otimes I_N)(I_M \otimes F_N^{-1})y_{tf} =$$  [Equation 14]

$$(F_M \otimes I_N)(I_M \otimes F_N^{-1})H_{tf}x_{tf} = (F_M \otimes F_N^{-1})H_{tf}x_{tf} =$$

$$(F_M \otimes F_N^{-1})H_{tf}(F_M \otimes F_N^{-1})^{-1}(F_M \otimes F_N^{-1})x_{tf} =$$

$$H_{Dd}x_{Dd}(F_M \otimes F_N^{-1})H_{tf}(F_M \otimes F_N^{-1})^{-1} =$$

$$H_{Dd}(F_M \otimes F_N^{-1})x_{tf} = x_{Dd}$$

In Equation 14, $F_M$ may be an M×M DFT matrix, and $F_N^{-1}$ may be an N×N IDFT matrix. $(F_M \otimes F_N^{-1})$ may mean a symplectic Fourier transform (SFT) transformation, and may serve to transform a frequency-time domain signal vector into a delay-frequency domain signal vector. In Equation 14, $H_{Dd}$ may be a channel matrix in the delay- Doppler domain, and $x_{Dd}$ may be a transmission signal vector in the delay-Doppler domain.

In order to identify the channel characteristics in the delay-Doppler domain, it may be convenient to assume that the radio channel environment does not change with time as in the frequency-time domain. A spreading operation using a DFT matrix along the frequency axis and the time axis will be described. An inverse Fourier transform operation performed along the frequency axis may be defined as in Equation 15 below.

$$y_{td} = \{(I_M \otimes F_N^{-1})y_{tf}\} = (I_M \otimes F_N^{-1})H_{tf}x_{tf} \quad \text{[Equation 15]}$$

-continued $$= \begin{bmatrix} F_N^{-1}H_{tf}^0 F_N & 0 & \ddots & 0 \\ 0 & F_N^{-1}H_{tf}^1 F_N & \ddots & 0 \\ \vdots & \vdots & \ddots & \vdots \\ 0 & 0 & \ddots & F_N^{-1}H_{tf}^{M-1}F_N \end{bmatrix} x_{td}$$

$$= \begin{bmatrix} H_{td}^0 & 0 & \ddots & 0 \\ 0 & H_{td}^1 & \ddots & 0 \\ \vdots & \vdots & \ddots & \vdots \\ 0 & 0 & \ddots & H_{td}^{M-1} \end{bmatrix} x_{td} = H_{td}x_{td}$$

In Equation 15, $y_{td}$ and $x_{td}$ may be results of performing inverse Fourier transform on the frequency-time reception signal and the frequency-time transmission signal along the time axis, respectively. Since $H_{tf}^m$ is a diagonal matrix when the radio channel does not change, $H_{td}^m = F_N^{-1} H_{tf}^m F_N$ may be a circulant matrix. Here, $H_{td}$ may be a block diagonal matrix, and $H_{td}^m$ may be an m-th (N×N) block in $H_{td}$.

In Equation 15, when a Fourier transform operation is performed along the time axis for transformation into the delay-Doppler domain, Equation 16 below may be defined.

$$y_{Dd} = \{(F_M \otimes I_N)y_{td}\} = (F_M \otimes I_N)H_{td}(F_M \otimes I_N)^{-1}\{(F_M \otimes I_N)x_{td}\} \quad \text{[Equation 16]}$$

$$= (F_M \otimes I_N)H_{td}(F_M^{-1} \otimes I_N)x_{Dd}$$

$$= \begin{bmatrix} f_M(0,0) & 0 & \ddots & f_M(0,1) & 0 & \ddots & f_M(0,2) & 0 & \ddots \\ 0 & f_M(0,0) & \ddots & 0 & f_M(0,1) & \ddots & 0 & f_M(0,2) & \ddots \\ \ddots & \ddots & \ddots & \ddots & \ddots & \ddots & \ddots & \ddots & \ddots \\ f_M(1,0) & 0 & \ddots & f_M(1,1) & 0 & \ddots & f_M(1,2) & 0 & \ddots \\ 0 & f_M(1,0) & \ddots & 0 & f_M(1,1) & \ddots & 0 & f_M(1,2) & \ddots \\ \ddots & \ddots & \ddots & \ddots & \ddots & \ddots & \ddots & \ddots & \ddots \\ f_M(2,0) & 0 & \ddots & f_M(2,1) & 0 & \ddots & f_M(2,2) & 0 & \ddots \\ 0 & f_M(2,0) & \ddots & 0 & f_M(2,1) & \ddots & 0 & f_M(2,2) & \ddots \\ \ddots & \ddots & \ddots & \ddots & \ddots & \ddots & \ddots & \ddots & \ddots \end{bmatrix}$$

$$\cdot \begin{bmatrix} H_{td}^0 & 0 & 0 & \ddots \\ 0 & H_{td}^1 & 0 & \ddots \\ 0 & 0 & H_{td}^2 & \ddots \\ \ddots & \ddots & \ddots & \ddots \end{bmatrix}$$

$$\cdot \begin{bmatrix} f_M^{-1}(0,0) & 0 & \ddots & f_M^{-1}(0,1) & 0 & \ddots & f_M^{-1}(0,2) & 0 & \ddots \\ 0 & f_M^{-1}(0,0) & \ddots & 0 & f_M^{-1}(0,1) & \ddots & 0 & f_M^{-1}(0,2) & \ddots \\ \ddots & \ddots & \ddots & \ddots & \ddots & \ddots & \ddots & \ddots & \ddots \\ f_M^{-1}(1,0) & 0 & \ddots & f_M^{-1}(1,1) & 0 & \ddots & f_M^{-1}(1,2) & 0 & \ddots \\ 0 & f_M^{-1}(1,0) & \ddots & 0 & f_M^{-1}(1,1) & \ddots & 0 & f_M^{-1}(1,2) & \ddots \\ \ddots & \ddots & \ddots & \ddots & \ddots & \ddots & \ddots & \ddots & \ddots \\ f_M^{-1}(2,0) & 0 & \ddots & f_M^{-1}(2,1) & 0 & \ddots & f_M^{-1}(2,2) & 0 & \ddots \\ 0 & f_M^{-1}(2,0) & \ddots & 0 & f_M^{-1}(2,1) & \ddots & 0 & f_M^{-1}(2,2) & \ddots \\ \ddots & \ddots & \ddots & \ddots & \ddots & \ddots & \ddots & \ddots & \ddots \end{bmatrix} x_{Dd}$$

$$= H_{Dd}x_{Dd}$$

In Equation 16, $f_M(k,l)$ and $f_M^{-1}(k,l)$ may mean (k,l) elements of the M-DFT matrix and the M-IDFT matrix, respectively. and $y_{Dd}$ and $x_{Dd}$ may indicate a delay-Doppler domain reception signal and a delay-Doppler domain transmission signal, respectively. Here, it may be confirmed that the Fourier transform and the inverse Fourier transform are performed on the channel matrix at (N×N) block intervals. When expressed only with elements of (N×N) intervals, the circulant matrix structure may be confirmed as shown in Equation 17 below.

$$\begin{bmatrix} h_{Dd}(k,l) & h_{Dd}(k,l+N) & h_{Dd}(k,l+2N) & \ddots \\ h_{Dd}(k+N,l) & h_{Dd}(k+N,l+N) & h_{Dd}(k+N,l+2N) & \ddots \\ h_{Dd}(k+2N,l) & h_{Dd}(k+2N,l+N) & h_{Dd}(k+2N,l+2N) & \ddots \\ & \ddots & \ddots & \ddots \end{bmatrix}$$ [Equation 17]

$$= \begin{bmatrix} h_{Dd}^{0,0}(k,l) & h_{Dd}^{0,1}(k,l) & h_{Dd}^{0,2}(k,l) & \ddots \\ h_{Dd}^{1,0}(k,l) & h_{Dd}^{1,1}(k,l) & h_{Dd}^{1,2}(k,l) & \ddots \\ h_{Dd}^{2,0}(k,l) & h_{Dd}^{2,1}(k,l) & h_{Dd}^{2,2}(k,l) & \ddots \\ & \ddots & \ddots & \ddots \end{bmatrix}$$

$$= \begin{bmatrix} f_M(0,0) & f_M(0,1) & f_M(0,2) & \ddots \\ f_M(1,0) & f_M(1,1) & f_M(1,2) & \ddots \\ f_M(2,0) & f_M(2,1) & f_M(2,2) & \ddots \\ & \ddots & \ddots & \ddots \end{bmatrix} \begin{bmatrix} h_{td}^0(k,l) & 0 & 0 & \ddots \\ 0 & h_{td}^1(k,l) & 0 & \ddots \\ 0 & 0 & h_{td}^2(k,l) & \ddots \\ & \ddots & \ddots & \ddots \end{bmatrix} \begin{bmatrix} f_M^{-1}(0,0) & f_M^{-1}(0,1) & f_M^{-1}(0,2) & \ddots \\ f_M^{-1}(1,0) & f_M^{-1}(1,1) & f_M^{-1}(1,2) & \ddots \\ f_M^{-1}(2,0) & f_M^{-1}(2,1) & f_M^{-1}(2,2) & \ddots \\ & \ddots & \ddots & \ddots \end{bmatrix}$$

$$= F_M \begin{bmatrix} h_{td}^0(k,l) & 0 & 0 & \ddots \\ 0 & h_{td}^1(k,l) & 0 & \ddots \\ 0 & 0 & h_{td}^2(k,l) & \ddots \\ & \ddots & \ddots & \ddots \end{bmatrix} F_M^{-1}$$

In Equation 17, $h_{Dd}(k,l)$ may be the (k,l)-th element of the channel matrix $H_{Dd}$, and $h_{Dd}^{p,q}(k,l)$ may represent the (p,q)-th sub-matrix when $H_{Dd}$ is divided into (N×N) block units. That is, $h_{Dd}^{p,q}(k,l) = h_{Dd}((p-1)N+k, (q-1)N+l)$ may be defined. The above-described equation may be a form of decomposing a circulant matrix into a diagonal matrix and a DFT matrix. The left side of the above equation may mean that $H_{Dd}$ has circulant characteristic at an interval of (N×N) blocks. Summarizing all the above results, when $H_{Dd}$ is decomposed into (N×N) blocks, each block may have circulant characteristics, and may also have circulant characteristics in block units at the interval of (N×N) blocks.

FIG. 26 is a conceptual diagram illustrating a first exemplary embodiment of a delay-Doppler effective channel matrix when N=M=4.

Referring to FIG. 26, when the radio channel environment does not change, the value of each element of the channel matrix according to the position may be a constant. When the radio channel environment changes with time, each element of the channel matrix may be expressed as a function according to the position in the matrix, and the value of the element of the channel matrix may vary according to the position thereof.

In the basic system model in the time domain, a convolution operation between time domain signals may be performed. In this case, one of two signals may be transformed into a circulant matrix, the other signal may be vectorized, and a result of the convolution operation may be a result of a product operation between the signal transformed into the circulant matric and the vectorized signal. In case of a delay-Doppler domain signal, the channel matrix may be in form of a block circulant matrix, and a transmission signal may be in form of a one-dimensional vector. That is, the relationship between the two signals may be a convolutional relationship, and the two signals may have convolution characteristics not only in units of samples but also in units of N-sample blocks. The two signals may include the transmission signal and the reception signal. The reception signal and the transmission signal may be represented by an (N×M) matrix. When the block circulant matrix is expressed as a (N×M) matrix, the above-described relationship may be expressed in form of a two-dimensional convolution as shown in Equation 18 below.

$$x_{Dd} = \begin{bmatrix} x_{Dd}^0 \\ x_{Dd}^1 \\ \vdots \\ x_{Dd}^{M-1} \end{bmatrix}, \quad X_{Dd} = \begin{bmatrix} x_{Dd}^0 & x_{Dd}^1 & \cdots & x_{Dd}^{M-1} \end{bmatrix}$$ [Equation 18]

$$y_{Dd} = \begin{bmatrix} y_{Dd}^0 \\ y_{Dd}^1 \\ \vdots \\ y_{Dd}^{M-1} \end{bmatrix}, \quad Y_{Dd} = \begin{bmatrix} y_{Dd}^0 & y_{Dd}^1 & \cdots & y_{Dd}^{M-1} \end{bmatrix}$$

$$Y_{Dd} = conv(\hat{H}_{Dd}, X_{Dd})$$

$$y_{Dd}(\tau, v) = \sum_p \sum_q \hat{h}_{Dd}(p,q) x_{Dd}(\tau-p, v-q)$$

In Equation 18, $X_{Dd}$ and $Y_{Dd}$ may be values obtained by transforming the transmission signal vector $X_{Dd}$ and the reception signal vector $Y_{Dd}$ into (N×M) matrixes, respectively. $\hat{H}_{Dd}$ may be a (N×M) matrix in which each column vector is transformed to match each circulant block of the channel matrix $H_{Dd}$ having a block circulant matrix form. $y_{Dd}(\tau, v)$ may be a value corresponding to the ($\tau$, v) -th element of the matrix $Y_{Dd}$. $x_{Dd}(\tau, v)$ may be a value corresponding to the ($\tau$, v)-th element of the matrix $X_{Dd}$. Also, $\hat{h}_{Dd}(\tau, v)$ may be a value corresponding to the ($\tau$, v) -th element of the matrix $\hat{H}_{Dd}$.

FIG. 27 is a conceptual diagram illustrating a first exemplary embodiment of a delay-Doppler channel matrix when N=M=4.

Referring to FIG. 27, $\hat{H}_{Dd}$ may be a channel matrix obtained by transforming a channel matrix $H_{Dd}$ having a block circulant matrix form into an (N×M) matrix.

In summary, in the delay-Doppler domain, a reception signal may have a two-dimensional convolution form between a transmission signal and a channel. The transmission signal may be convolved with the channel along the delay axis, the result of the convolution may be spread along the delay axis, and the spread result may be convolved along the Doppler axis. The result of spreading the result of the convolution along the Doppler axis may be the reception signal.

The above-described result may be a result under the assumption that there is no channel change within one OFDM symbol. Since a channel of a high-speed mobile environment is a time-varying channel, the channel may change even within one OFDM symbol. In this case, the assumption that the radio channel does not change may not be valid. Since the channel in the frequency-time domain is not a diagonal matrix, the conventional assumption may not be established in the above-described time-delay domain relationship equation as shown in Equation 19 below.

$$F_N^{-1} H_{tf}^m F_n = H_{td}^m \neq \text{circulant} \quad \text{[Equation 19]}$$

Since $H_{td}^m$ is not a perfect circulant structure, the relationship between $H_{td}^m$, $x_{td}$, and $y_{td}$ may not be accurately expressed as a convolutional relationship. Therefore, interference components dependent on the frequency or delay axis direction may occur in $y_{td}$ as shown in Equation 20 below.

$$y_{Dd}(\tau, v) = \sum_q \sum_p \left( \left( \hat{h}_{Dd}(p, q) + \hat{h}_{intrfr}(p) \right) \cdot x_{Dd}(\tau - p, v - q) \right) \quad \text{[Equation 20]}$$

$$= \sum_q \sum_p \left( \hat{h}_{Dd}(p, q) x_{Dd}(\tau - p, v - q) \right) + \text{interference}$$

$$Y_{Dd} = \text{conv}(\hat{H}_{Dd}, X_{Dd}) + \text{interference}$$

In summary, when the radio channel is an environment that does not change with time, the reception signal in the delay-Doppler domain may be accurately expressed as a two-dimensional convolution of the transmission signal and the channel. When the radio channel is a time-varying channel and the reception signal is expressed as the two-dimensional convolution of the transmission signal and the channel, an error may occur due to interference components.

Based on the above results, when the reception signal vector in the delay-Doppler domain is expressed as a product of the transmission signal vector and the channel matrix, the channel matrix may be an effective channel matrix in the delay-Doppler domain, and the effective channel matrix is a block circulant matrix. Equation 21 below may represent the above-described relationship between the transmission and reception signals in the delay-Doppler domain.

$$y_{Dd} = H_{Dd} x_{Dd} \quad \text{[Equation 21]}$$

$$\begin{bmatrix} y_{Dd}^0 \\ y_{Dd}^1 \\ \vdots \\ y_{Dd}^{M-1} \end{bmatrix} = \begin{bmatrix} H_{Dd}^{0,0} & H_{Dd}^{0,1} & \cdots & H_{Dd}^{0,M-1} \\ H_{Dd}^{1,0} & H_{Dd}^{1,1} & \cdots & H_{Dd}^{1,M-1} \\ \vdots & \vdots & \ddots & \vdots \\ H_{Dd}^{M-1,0} & H_{Dd}^{M-1,1} & \cdots & H_{Dd}^{M-1,M-1} \end{bmatrix} \begin{bmatrix} x_{Dd}^0 \\ x_{Dd}^1 \\ \vdots \\ x_{Dd}^{M-1} \end{bmatrix}$$

In Equation 21, assuming that the channel does not change with time, $H_{Dd}$ may be a block circulant matrix. If $H_{Dd}$ is a block circulant matrix, a relation shown in Equation 22 below may be defined.

$$H_{Dd}^0 = H_{Dd}^{0,0} = \quad \text{[Equation 22]}$$
$$H_{Dd}^{1,1} = H_{Dd}^{2,2} = \ldots = H_{Dd}^{M-3,M-3} = H_{Dd}^{M-2,M-2} = H_{Dd}^{M-1,M-1}$$
$$H_{Dd}^1 = H_{Dd}^{1,0} = H_{Dd}^{2,1} =$$
$$H_{Dd}^{3,2} = \ldots = H_{Dd}^{M-2,M-3} = H_{Dd}^{M-1,M-2} = H_{Dd}^{0,M-1}$$
$$H_{Dd}^2 = H_{Dd}^{2,0} = H_{Dd}^{3,1} =$$
$$H_{Dd}^{4,2} = \ldots = H_{Dd}^{M-1,M-3} = H_{Dd}^{0,M-2} = H_{Dd}^{1,M-1}$$

$$\vdots$$

$$H_{Dd}^{M-1} = H_{Dd}^{M-1,0} =$$
$$H_{Dd}^{0,1} = H_{Dd}^{1,2} = \ldots = H_{Dd}^{M-4,M-3} = H_{Dd}^{M-3,M-2} = H_{Dd}^{M-2,M-1}$$

If each matrix block having a size of (N×N) in Equation 22 has the relation of Equation 22, the relation between the transmission and reception signals in the delay-Doppler domain may be rewritten as shown in Equation 23 below.

$$\begin{bmatrix} y_{Dd}^0 \\ y_{Dd}^1 \\ \vdots \\ y_{Dd}^{M-1} \end{bmatrix} = \begin{bmatrix} H_{Dd}^0 & H_{Dd}^{M-1} & \cdots & H_{Dd}^1 \\ H_{Dd}^1 & H_{Dd}^0 & \cdots & H_{Dd}^2 \\ \vdots & \vdots & \ddots & \vdots \\ H_{Dd}^{M-1} & H_{Dd}^{M-2} & \cdots & H_{Dd}^0 \end{bmatrix} \begin{bmatrix} x_{Dd}^0 \\ x_{Dd}^1 \\ \vdots \\ x_{Dd}^{M-1} \end{bmatrix} \quad \text{[Equation 23]}$$

From Equation 23, Equation 24 below may be derived by dividing $H_{Dd}$ into channel matrix block units each having a size of (N×N).

$$y_{Dd}^0 = \sum_{i=0}^{M-1} H_{Dd}^{\text{mod}(M-i,M)} x_{Dd}^i \quad \text{[Equation 24]}$$

$$y_{Dd}^1 = \sum_{i=0}^{M-1} H_{Dd}^{\text{mod}(M+1-i,M)} x_{Dd}^i$$

$$y_{Dd}^2 = \sum_{i=0}^{M-1} H_{Dd}^{\text{mod}(M+2-i,M)} x_{Dd}^i$$

$$\vdots$$

$$y_{Dd}^{M-1} = \sum_{i=0}^{M-1} H_{Dd}^{\text{mod}(2M-1-i,M)} x_{Dd}^i$$

If general transmission and reception signals are summarized in the delay-Doppler domain when a radio channel does not change, the relationship between the transmission and reception signals in case of transmitting a pilot sequence (e.g., random sequence) may be easily defined.

Figure 28:
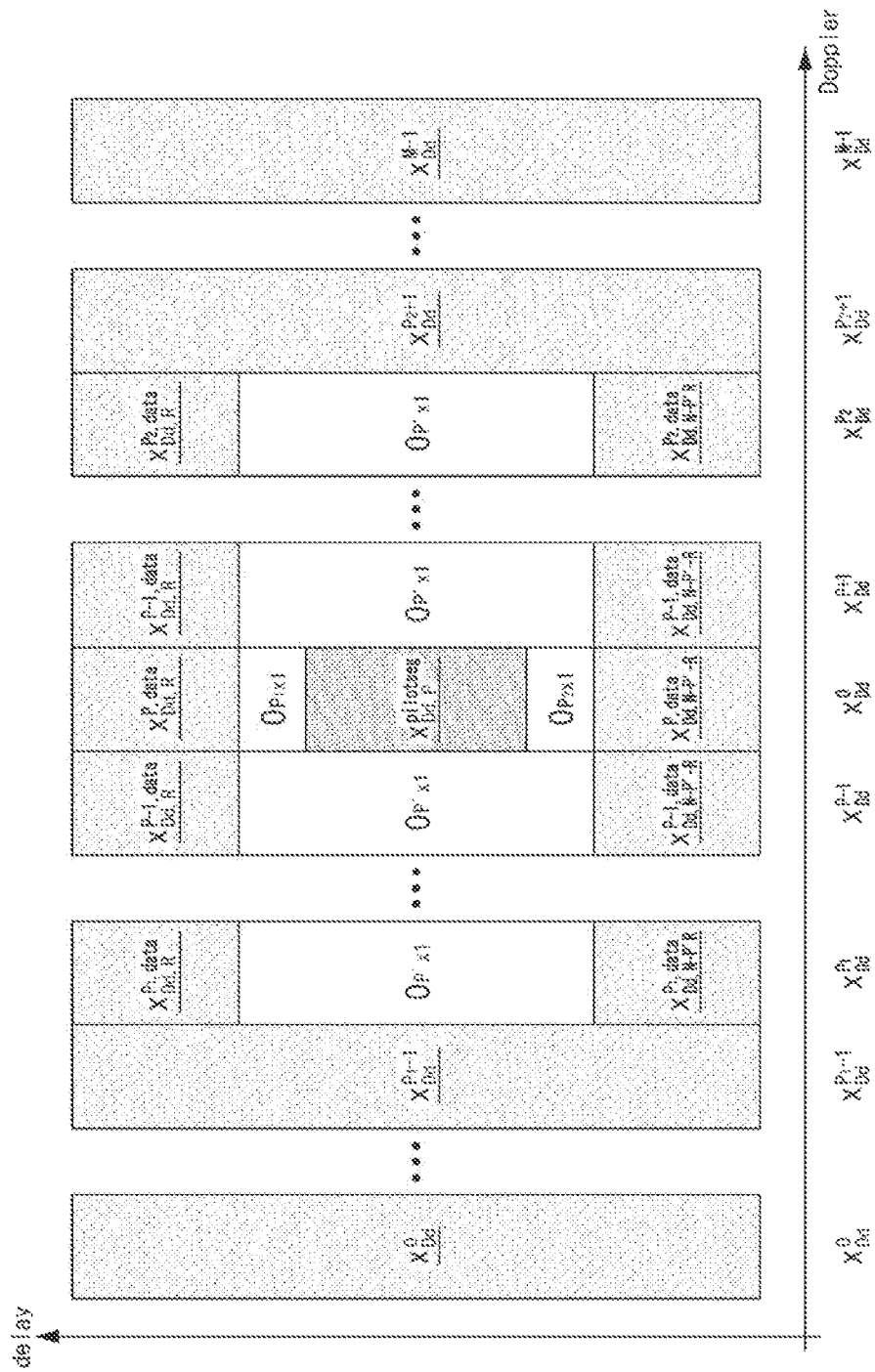
FIG. 28 is a conceptual diagram illustrating a first exemplary embodiment of a structure of a transmission signal including a random sequence (e.g., reference signal) in the delay-Doppler domain.

FIG. 28 is a conceptual diagram illustrating a first exemplary embodiment of a structure of a transmission signal including a random sequence (e.g., reference signal) in the delay-Doppler domain.

Referring to FIG. 28, $X_{Dd,n}^{m,data}$ may mean a data transmission signal in the delay-Doppler domain, which occupies as many resource regions as n in the m-th transmission vector, and a condition of ($P'=P+P_1+P_2$) may be satisfied. $P_1$ and $P_2$ may mean the size of the guard periods positioned before and after a pilot sequence along the delay axis, respectively. The transmission signal including the pilot sequence in the delay-Doppler domain may satisfy the following condition(s). The pilot sequence may refer to a random sequence.

Condition 1) When a transmission signal vector $x_{Dd}$ having a size of (NM×1) is decomposed into M (N×1) unit vectors (e.g., when $x_{Dd}$ is decomposed to $x_{Dd}^0, x_{Dd}^1, \ldots, x_{Dd}^{M-1}$), a pilot sequence $x_{Dd,P2}^{pilot\_seq}$ having a size of (P×1) may exist in one (N×1) unit vector $x_{Dd}^p$ among M (N×1) unit vectors. Here, P, P'≤N, 0≤p<M may be satisfied.

Condition 2) In $x_{Dd}^p$ in which the pilot sequence is present, null values may be assigned to resources adjacent to the pilot sequence. In this case, the size of the resources to which the null values are assigned may be proportional to the size of the delay spread of the channel.

Condition 3) Among the remaining M−1 (N×1) unit vectors excluding $x_{Dd}^p$ in which the pilot sequence is present, vectors adjacent to $x_{Dd}^p$ may be assigned null values in corresponding delay axis resource positions to which $x_{Dd,P}^{pilot\_seq}$ and null values are assigned.

Condition 4) All (N×1) unit vectors may allocate data to the remaining resource regions other than the resource regions occupied by the pilot sequence and null values.

Figure 29:
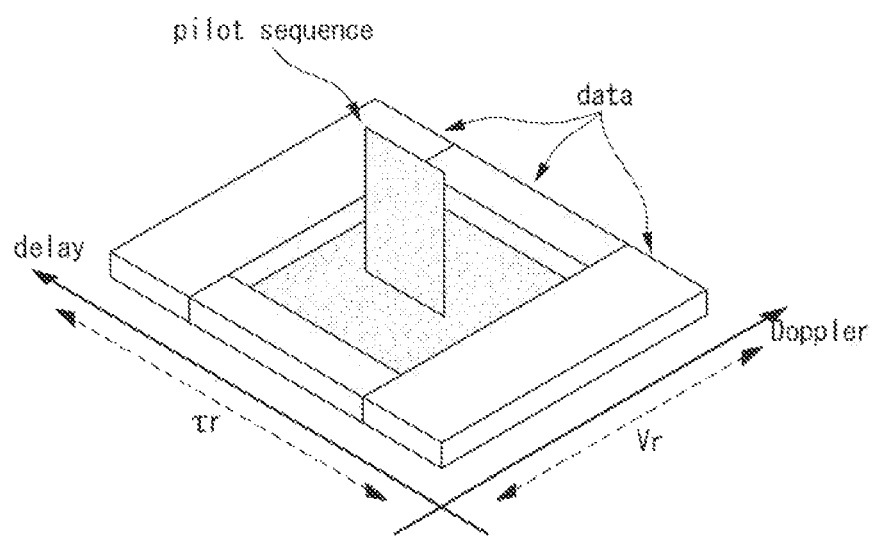
FIG. 29 is a conceptual diagram illustrating a second exemplary embodiment of a structure of a transmission signal including a random sequence (e.g., reference signal) in the delay-Doppler domain.

FIG. 29 is a conceptual diagram illustrating a second exemplary embodiment of a structure of a transmission signal including a random sequence (e.g., reference signal) in the delay-Doppler domain.

A structure of a transmission signal shown in FIG. 29 may satisfy the above-described condition(s). The above-described condition(s) may be expressed by Equation 25 below.

$$x_{Dd}^i = \begin{cases} \begin{bmatrix} x_{Dd,R}^{i,data\_h} \\ 0_{P_1 \times 1} \\ x_{Dd,P}^{pilot\_seq} \\ 0_{P_2 \times 1} \\ x_{Dd,(N-P-R)}^{i,data\_l} \end{bmatrix} & (i = p) \\ \begin{bmatrix} x_{Dd,R}^{i,data\_h} \\ 0_{P' \times 1} \\ x_{Dd,(N-P-R)}^{i,data\_l} \end{bmatrix} & (p1 \le i \le p2) \\ x_{Dd}^i & \text{(otherwise)} \end{cases} \quad \begin{array}{l} 0 \le i, p < M, P' \le N, \\ P' = P + P_1 + P_2 \end{array}$$ [Equation 25]

In the above-described condition(s), a window matrix $W_P$ may be defined, and a channel matrix $H_{Dd}$ may be estimated based on the window matrix $W_P$. $W_P$ may be defined as in Equation 26 below.

$$W_P = [O_{P \times R} \; I_P \; O_{P \times (N-R-P)}]$$ [Equation 26]

In Equation 26, $O_{R \times P}$ may be a zero matrix having a size of (P×R), and $I_P$ may be an identity matrix having a size of (P×P). Among the above-mentioned equations, when the relational equation of the transmission and reception signals obtained by dividing the channel matrix $H_{Dd}$ in units of (N×N) is multiplied by the window matrix $W_P$, Equation 27 below may be derived.

[Equation 27]

$$y_{Dd,P}^m = W_P y_{Dd}^m = W_P \left( \sum_{i=0}^{M-1} H_{Dd}^{mod(M+m-i,M)} x_{Dd}^i \right)$$

$$= W_P \left( H_{Dd}^{mod(M+m-p,M)} x_{Dd}^p + \sum_{\substack{i \ne p \\ p1 \le i \le p2}} H_{Dd}^{mod(M+m-i,M)} x_{Dd}^i + \sum_{\substack{i < p1 \\ i > p2}} H_{Dd}^{mod(M+m-i,M)} x_{Dd}^i \right)$$

$$= \underbrace{W_P H_{Dd}^{mod(M+m-p,M)} x_{Dd}^p}_{\text{Diagonal Block}} + \underbrace{\sum_{\substack{i \ne p \\ p1 \le i \le p2}} W_P H_{Dd}^{mod(M+m-i,M)} x_{Dd}^i}_{\text{Blocks near the Diagonal Block}} + \underbrace{\sum_{\substack{i < p1 \\ i > p2}} W_P H_{Dd}^{mod(M+m-i,M)} x_{Dd}^i}_{\text{Blocks far from the Diagonal Block}}$$

Most of the (N×N) unit channel blocks may have a low channel gain, excluding a diagonal block and channel blocks around the diagonal block. Such the characteristics may vary depending on the channel environment. As the channel changes rapidly, a channel gain value of a non-negligible level may be obtained even in channel blocks far from the diagonal block. When the pilot region is designed in such a manner in which $p_1$ and $p_2$ are adjusted, it may be possible to respond to various channels.

Figure 30:
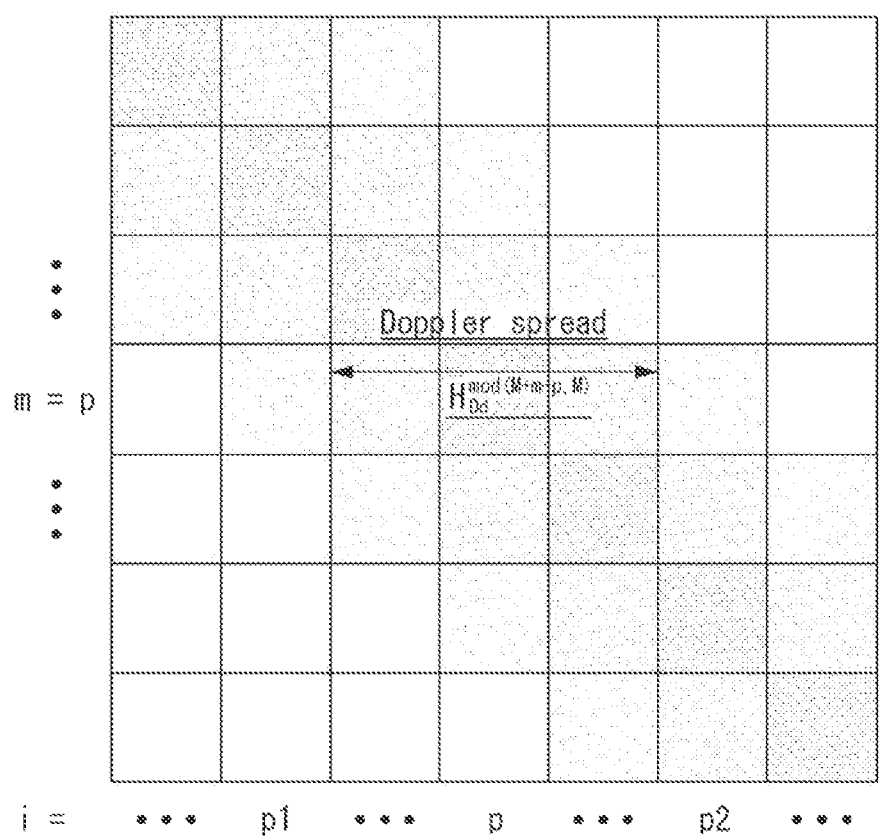
FIG. 30 is a conceptual diagram illustrating a channel gain of a block matrix unit of a delay-Doppler effective channel matrix.

FIG. 30 is a conceptual diagram illustrating a channel gain of a block matrix unit of a delay-Doppler effective channel matrix.

Referring to FIG. 30, if channel gains are identified for (N×N) block matrices of the delay-Doppler matrix, the channel gain may be higher as the block matrix approaches the diagonal, and the gain of the channel block outside $p_1$ and $p_2$ may be negligibly small.

Therefore, the last term (blocks far from the diagonal block) of Equation 27 may be ignored, and in consideration of this, the reception signal may be rewritten as Equation 28 below.

$$y_{Dd,P}^m \approx \underbrace{W_P H_{Dd}^{mod(M+m-p,M)} x_{Dd}^p}_{\text{Diagonal Block}} + \underbrace{\sum_{\substack{i \ne p \\ p1 \le i \le p2}} W_P H_{Dd}^{mod(M+m-i,M)} x_{Dd}^i}_{\text{Blocks near the Diagonal Block}}$$ [Equation 28]

Figure 31:
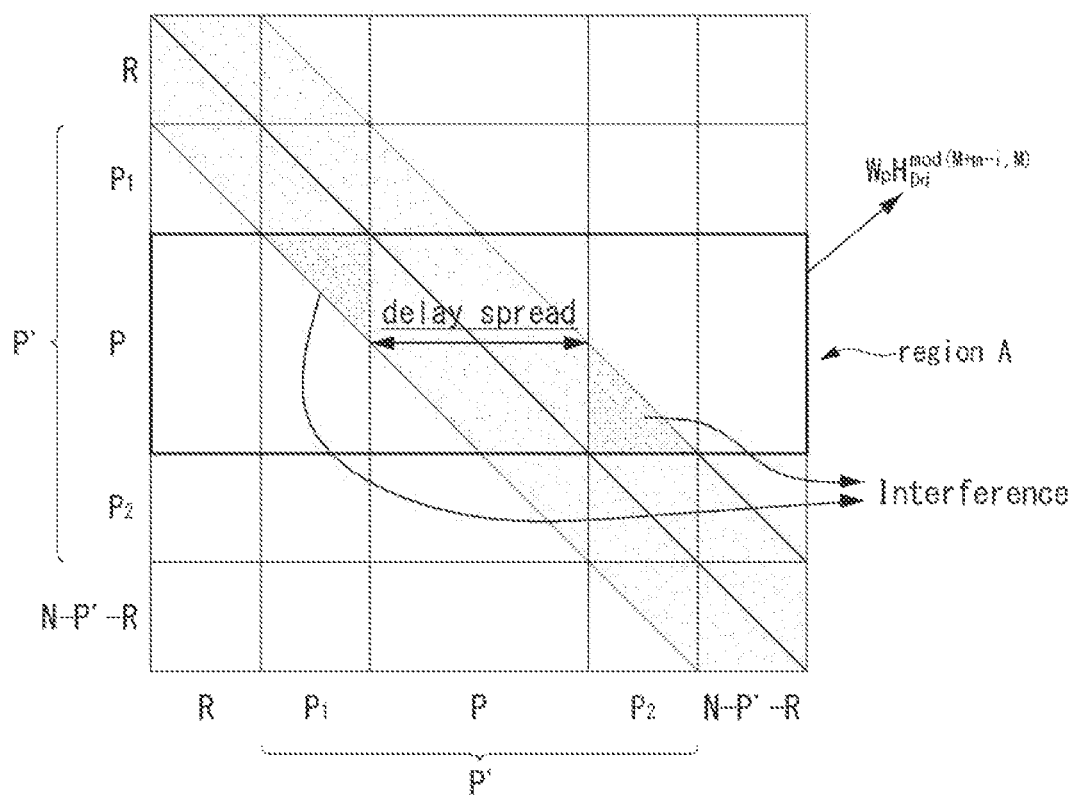
FIG. 31 is a conceptual diagram illustrating a channel spreading region in a delay-Doppler identity matrix.

FIG. 31 is a conceptual diagram illustrating a channel spreading region in a delay-Doppler identity matrix.

Referring to FIG. 31, in the (N×N) unit matrix, a portion that actually affects the reception signal by the window matrix $W_P$ may be a region A. A significant channel gain may be obtained only within the region A, which means $W_P H_{Dd}^{mod(M+m-i,M)}$. A transmission signal region related to a period other than the period P' may be allocated to general data rather than information for channel estimation. Signals may be carefully allocated for channel estimation in the period P'. The transmit vector period that the period P' affects may be a period corresponding to the pilot sequence and the guard period. Since the value of $x_{Dd,P'}^i$ is always 0 in the corresponding period, the second term (i.e., blocks near the diagonal block) in Equation 28 may be ignored. In addition, in the first term of Equation 28, each of $x_{Dd,P_1}^p$ and $x_{Dd,P_2}^p$ is 0, and thus Equation 28 may be briefly expressed as Equation 29 below.

[Equation 29]

$$y_{Dd,P}^m \approx W_P H_{Dd}^{mod(M+m-p,M)} x_{Dd}^p \approx$$

$$\underbrace{\left(H_{Dd}^{mod(M+m-p,M)}\right)_{P \times P_1} x_{Dd,P_1}^p}_{x_{Dd,P_1}^p = 0} + \underbrace{\left(H_{Dd}^{mod(M+m-p,M)}\right)_{P \times P} x_{Dd,p}^p}_{W_P H_{Dd}^{mod(M+m-p,M)} (W_P)^T} +$$

-continued $$\underbrace{\left(H_{Dd}^{mod(M+m-p,M)}\right)_{P \times P_2} x_{Dd,P_2}^p}_{x_{Dd,P_2}^p = 0} \approx W_P H_{Dd}^{mod(M+m-p,M)} (W_P)^T x_{Dd,P}^p$$

In Equation 29, $(H_{Dd}^{mod(M+m-p,M)})_{P \times P}$, $(H_{Dd}^{mod(M+m-p,M)})_{P \times P_1}$, and $(H_{Dd}^{mod(M+m-p,M)})_{P \times P_2}$ may refer to a period P×P, a period P×$P_1$, and a period P×$P_2$ of the block matrix, respectively. If the m-th reception vector is simplified, M equations may be obtained as shown in Equation 30 below.

$$y_{Dd,P}^0 \approx W_P H_{Dd}^{mod(M+0-p,M)} (W_P)^T x_{Dd,P}^p = \quad \text{[Equation 30]}$$
$$\left(H_{Dd}^{mod(M-p,M)}\right)_{P \times P} x_{Dd,P}^p$$

$$y_{Dd,P}^1 \approx W_P H_{Dd}^{mod(M+1-p,M)} (W_P)^T x_{Dd,P}^p =$$
$$\left(H_{Dd}^{mod(M+1-p,M)}\right)_{P \times P} x_{Dd,P}^p$$

$$y_{Dd,P}^2 \approx W_P H_{Dd}^{mod(M+2-p,M)} (W_P)^T x_{Dd,P}^p =$$
$$\left(H_{Dd}^{mod(M+2-p,M)}\right)_{P \times P} x_{Dd,P}^p$$
$$\vdots$$

$$y_{Dd,P}^{M-1} \approx W_P H_{Dd}^{mod(M+M-1-p,M)} (W_P)^T x_{Dd,P}^p =$$
$$\left(H_{Dd}^{mod(2M-1-p,M)}\right)_{P \times P} x_{Dd,P}^p$$

In Equation 30, $x_{Dd,P}^p$ may be a signal known to the receiver as a transmission pilot sequence, and $y_{Dd,P}^m$ may be a reception signal. Based on Equation 30, $(\hat{H}_{Dd}^0)_{P \times P}$, $(\hat{H}_{Dd}^1)_{P \times P}, \ldots, (\hat{H}_{Dd}^{M-1})_{P \times P}$ each of which is an estimated value for a significant portion of the (N×N) unit channel may be obtained. Based on this, $\hat{H}_{Dd}^0, \hat{H}_{Dd}^1, \ldots, \hat{H}_{Dd}^{M-1}$, which are channel estimation values for (N×N) unit channels, may be obtained based on Equation 31 below.

$$\hat{H}_{Dd}^m = \begin{bmatrix} 0_{(R+P_1) \times (R+P_1)} & 0_{(R+P_1) \times P} & 0_{(R+P_1) \times (N-R-P_1-P_2)} \\ 0_{P \times (R+P_1)} & (\hat{H}_{Dd}^m)_{P \times P} & 0_{P \times (N-R-P_1-P_2)} \\ 0_{(N-R-P_1-P_2) \times (R+P_1)} & 0_{(N-R-P_1-P_2) \times P} & 0_{(N-R-P_1-P_2) \times (N-R-P_1-P_2)} \end{bmatrix} \quad \text{[Equation 31]}$$

Based on Equation 31, an effective channel matrix in the entire delay-Doppler domain may be obtained according to Equation 32 below.

$$\hat{H}_{Dd} = \begin{bmatrix} \hat{H}_{Dd}^0 & \hat{H}_{Dd}^{M-1} & \cdots & \hat{H}_{Dd}^1 \\ \hat{H}_{Dd}^1 & \hat{H}_{Dd}^0 & \cdots & \hat{H}_{Dd}^2 \\ \vdots & \vdots & \ddots & \vdots \\ \hat{H}_{Dd}^{M-1} & \hat{H}_{Dd}^{M-2} & \cdots & \hat{H}_{Dd}^0 \end{bmatrix} \quad \text{[Equation 32]}$$

In summary, if a random sequence is used as a pilot (e.g., pilot sequence) for channel estimation, the PAPR problem may be solved. In this case, when the periphery of the random sequence is emptied according to a predetermined rule, each unit reception signal vector may be expressed as a product of each unit channel matrix and the pilot sequence. Accordingly, estimated values of the unit channel matrices may be simply calculated one by one. However, in the above-described method, in addition to resources for the pilot, transmission resources as much as the delay spread and/or the Doppler spread of the channel need to be emptied, so that the resource use efficiency may be lowered compared to the impulse signal scheme.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a receiver in a communication system, the operation method comprising:
   receiving a time domain signal from a transmitter;
   transforming the time domain signal into a delay-Doppler domain signal;
   separating a reference signal region configured for transmission and reception of the delay-Doppler domain signal;
   performing a cross-correlation operation on the reference signal region;
   determining an effective region within the reference signal region based on a result of the cross-correlation operation; and
   estimating a channel based on a result of the cross-correlation operation on the effective region.

2. The operation according to claim 1, wherein the performing of the cross-correlation operation comprises:
   performing a one-dimensional cross-correlation operation along a delay axis at a first point on a Doppler axis within the reference signal region; and
   performing a one-dimensional cross-correlation operation along the delay axis at a second point on the Doppler axis within the reference signal region.

3. The operation method according to claim 1, wherein the delay-Doppler domain signal is a sequence having auto-correlation characteristics greater than or equal to a preset reference.

4. The operation method according to claim 1, wherein the effective region in which the reference signal is arranged is a central region within the reference signal region.

5. An operation method of a receiver in a communication system, the operation method comprising:
   receiving a time domain signal from a transmitter;
   transforming the time domain signal into a delay-Doppler domain signal;
   separating a first reference signal region configured for transmission and reception of a first reference signal and a second reference signal region configured for transmission and reception of a second reference signal in the delay-Doppler domain signal;

determining a first effective region by performing a first cross-correlation operation on the first reference signal region;

determining a second effective region by performing a second cross-correlation operation on, the second reference signal region; and estimating a channel based on a combination of a result of the first cross-correlation operation on the first effective region and a result of the second cross-correlation operation on the second effective region.

6. The operation method according to claim 5, wherein the determining of the first effective region comprises:

performing a one-dimensional cross-correlation operation along a delay axis at a first point on a Doppler axis within the first reference signal region;

performing a one-dimensional cross-correlation operation along the delay axis at a second point on the Doppler axis within the first reference signal region; and determining the first effective region based on results of the one-dimensional cross-correlation operations.

7. The operation method according to claim 5, wherein a sum of a result of an auto-correlation operation of the first reference signal and a result of an auto-correlation operation of the second reference signal has perfect auto-correlation characteristics.

8. The operation method according to claim 5, wherein the first reference signal region and the second reference signal region are independently configured so that interference between the first reference signal and the second reference signal does not occur.

9. The operation method according to claim 5, wherein the time domain signal includes the first reference signal, the second reference signal, and data.

* * * * *